US012080509B2

(12) United States Patent
Ando

(10) Patent No.: US 12,080,509 B2
(45) Date of Patent: Sep. 3, 2024

(54) X-RAY GENERATING APPARATUS, X-RAY IMAGING APPARATUS, AND METHOD OF ADJUSTING X-RAY GENERATING APPARATUS

(71) Applicant: CANON ANELVA CORPORATION, Kawasaki (JP)

(72) Inventor: Yoichi Ando, Tokyo (JP)

(73) Assignee: Canon Anelva Corporation, Kawasaki (JP)

( * ) Notice: Subject to any disclaimer, the term of this patent is extended or adjusted under 35 U.S.C. 154(b) by 0 days.

(21) Appl. No.: 18/616,914

(22) Filed: Mar. 26, 2024

(65) Prior Publication Data

US 2024/0234077 A1 Jul. 11, 2024

Related U.S. Application Data

(63) Continuation of application No. PCT/JP2022/034555, filed on Sep. 15, 2022.

(51) Int. Cl.

*H01J 35/30* (2006.01)
*H01J 35/14* (2006.01)
*H05G 1/32* (2006.01)

(52) U.S. Cl.

CPC ............ *H01J 35/30* (2013.01); *H01J 35/153* (2019.05); *H05G 1/32* (2013.01)

(58) Field of Classification Search

CPC ................................ H01J 35/30; H01J 35/153
See application file for complete search history.

(56) References Cited

U.S. PATENT DOCUMENTS

| | | | | |
|---|---|---|---|---|
| 2004/0208287 | A1* | 10/2004 | Deuringer ................ | H05G 1/52 378/121 |
| 2005/0141669 | A1 | 6/2005 | Shimono et al. | |
| 2014/0105367 | A1 | 4/2014 | Horvarth et al. | |

FOREIGN PATENT DOCUMENTS

| | | | |
|---|---|---|---|
| JP | 2001126650 | A | 5/2001 |
| JP | 2002195961 | A | 7/2002 |
| JP | 2004265602 | A | 9/2004 |
| TW | 201423819 | A | 6/2014 |

OTHER PUBLICATIONS

DE 4433133 C1 with English translation (Year: 1995).*
Office Action issued on Apr. 30, 2024, by the Taiwanese Patent Office in corresponding Taiwanese Patent Application No. 112134255, and an English Translation of the Office Action. (9 pages).

* cited by examiner

*Primary Examiner* — Chih-Cheng Kao
(74) *Attorney, Agent, or Firm* — BUCHANAN INGERSOLL & ROONEY PC

(57) ABSTRACT

An X-ray generating apparatus includes an X-ray generating tube including an electron gun and a target configured to generate X-rays upon receiving an electron beam emitted from the electron gun, a deflector configured to deflect the electron beam, a driving circuit configured to apply an accelerating voltage between a cathode of the electron gun and the target, and an adjuster configured to adjust deflection of the electron beam by the deflector in accordance with the accelerating voltage or an amount of change in the accelerating voltage so as to reduce a change in incident position of the electron beam onto the target due to a change in the accelerating voltage.

12 Claims, 19 Drawing Sheets

Va=V2 (|V2|>|V1|)

Va=V2 (|V2|>|V1|)

Va=V2 (|V2|>|V1|)

X-RAY GENERATING APPARATUS, X-RAY IMAGING APPARATUS, AND METHOD OF ADJUSTING X-RAY GENERATING APPARATUS

CROSS-REFERENCE TO RELATED APPLICATIONS

This application is a Continuation of International Patent Application No. PCT/JP2022/034555, filed Sep. 15, 2022, which is hereby incorporated by reference herein in their entirety.

BACKGROUND OF THE INVENTION

Field of the Invention

The present invention relates to an X-ray generating apparatus, an X-ray imaging apparatus, and a method of adjusting the x-ray generating apparatus.

Background Art

In a transmission type X-ray tube, a target is irradiated with an electron beam to emit X-rays from the target. The electron beam generated at the cathode is accelerated by an accelerating voltage and applied to the target. Changing this accelerating voltage will change the energy of an electron beam colliding with the target. Japanese Patent Laid-Open No. 2001-126650 discloses a transmission type X-ray tube apparatus including an X-ray transmission window, a thin metal film that forms an X-ray target provided on the vacuum side of the X-ray transmission window, an electron gun that generates an electron beam, and a deflecting electrode that deflects the electron beam. This thin metal film has a gradually changing thickness. In this X-ray tube apparatus, an electron beam is applied to a place where the thickness of the thin metal film coincides with the depth that an electron enters. This operation is implemented by changing the deflecting voltage applied to the deflecting electrode in accordance with the accelerating voltage of the electron beam generated from the electron gun.

In an X-ray imaging apparatus in which an X-ray generating apparatus is incorporated, the accelerating voltage can be changed to change the energy or energy distribution of X-rays generated by the X-ray generating apparatus. If, however, the incident position of an electron beam changes relative to a target in accordance with a change in accelerating voltage, the generation position of X-rays, that is, the focal position of the X-ray imaging apparatus changes. Accordingly, every time the accelerating voltage is changed, it is necessary to adjust the position of an X-ray detector for detecting the X-rays emitted from the X-ray generating apparatus.

SUMMARY OF THE INVENTION

The present invention can provide a technique advantageous in reducing a change in the generation position of X-rays due to a change in accelerating voltage.

A first aspect of the present invention is directed to an X-ray generating apparatus, and the apparatus comprises: an X-ray generating tube including an electron gun and a target configured to generate X-rays upon receiving an electron beam emitted from the electron gun; a deflector configured to deflect the electron beam; a driving circuit configured to apply an accelerating voltage between a cathode of the electron gun and the target; and an adjuster configured to adjust deflection of the electron beam by the deflector in accordance with the accelerating voltage or an amount of change in the accelerating voltage so as to reduce a change in incident position of the electron beam onto the target due to a change in the accelerating voltage.

A second aspect of the present invention is directed to an X-ray imaging apparatus, and the apparatus comprises: an X-ray generating apparatus according to the first aspect; and an X-ray detector configured to detect X-rays emitted from the X-ray generating apparatus.

A third aspect of the present invention is directed to a method of adjusting an X-ray generating apparatus, the apparatus includes an X-ray generating tube including an electron gun and a target configured to generate X-rays upon receiving an electron beam emitted from the electron gun, a deflector configured to deflect the electron beam, and a driving circuit configured to apply an accelerating voltage between a cathode of the electron gun and the target, the method comprising: a step of adjusting deflection of the electron beam by the deflector in accordance with the accelerating voltage or an amount of change in the accelerating voltage so as to reduce a change in incident position of the electron beam onto the target due to a change in the accelerating voltage.

DESCRIPTION OF THE EMBODIMENTS

Figure 1:
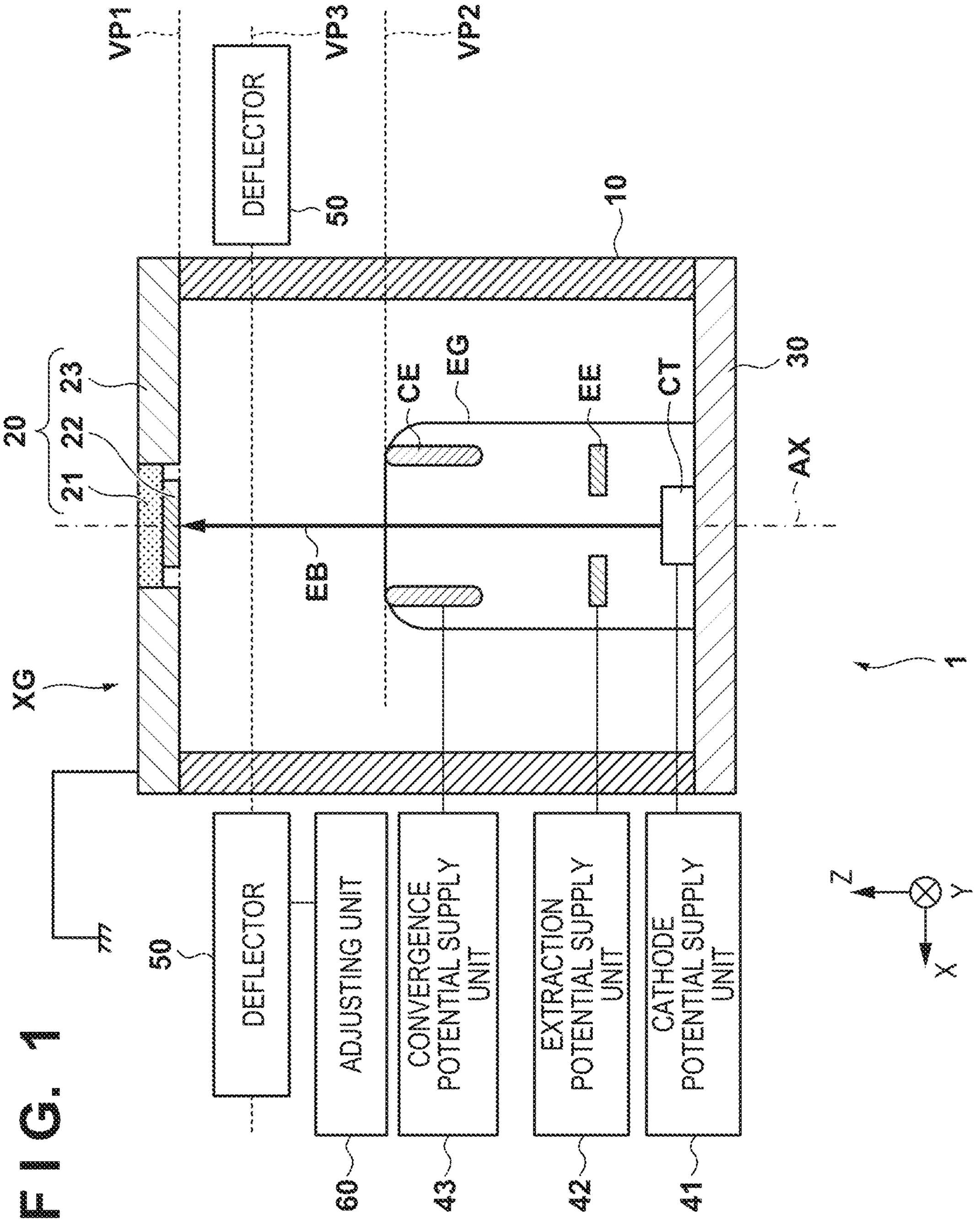
FIG. 1 is a view schematically showing a sectional arrangement near the center of an X-ray generating tube according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

FIG. 1 schematically shows a sectional arrangement of an X-ray generating tube XG near the center according to an embodiment. An X-ray generating apparatus 1 can be configured as a transmission type X-ray generating apparatus. The X-ray generating apparatus 1 includes the X-ray generating tube XG. The X-ray generating tube XG includes an electron gun EG and a target 22 that receives an electron beam EB or electron emitted from the electron gun EG and generates X-rays. In an example, the X-ray generating tube XG can include an insulating tube 10 having two opening ends, an anode 20 that closes one of the two opening ends of the insulating tube 10, and a closing member 30 that closes the other of the two opening ends of the insulating tube 10. The anode 20 can include the target 22, a target holding plate 21 that holds the target 22, and an electrode 23 that applies a potential to the target 22 through the target holding plate 21 while supporting the target holding plate 21. The anode 20 can be maintained at, for example, the ground potential. The closing member 30 can be configured to hold the electron gun EG. The insulating tube 10, the anode 20, and the closing member 30 can form a container that defines an enclosed space. The enclosed space can be maintained at a vacuum or a high degree of vacuum.

The electron gun EG can include a cathode CT, an extraction electrode EE that is arranged between the cathode CT and the anode 20, and a convergence electrode CE that is arranged between the extraction electrode EE and the anode 20. The cathode CT emits electrons. An accelerating voltage is supplied between the cathode CT and the anode 20. The amount of electrons entering the target 22 of the anode 20 per unit time, that is, a current, is called a tube current, which can depend on the extraction potential supplied to the extraction electrode EE. The convergence electrode CE converges the electrons or electron beam emitted from the cathode CT. The convergence electrode CE may include a plurality of electrodes.

The X-ray generating apparatus 1 can include a cathode potential supply unit 41 that supplies a cathode potential to the cathode CT. The cathode potential supply unit 41 may be understood as a driving circuit that supplies an accelerating voltage between the cathode CT and the anode 20 that can be maintained at the ground potential. The X-ray generating apparatus 1 can include an extraction potential supply unit 42 that supplies an extraction potential to the extraction electrode EE. The extraction potential supply unit 42 may be understood as a constituent element that supplies an extraction potential between the cathode CT and the extraction electrode EE. The X-ray generating apparatus 1 can include a convergence potential supply unit 43 that supplies a convergence potential to the convergence electrode CE. The convergence potential supply unit 43 may be understood as a constituent element that supplies a convergence voltage between the cathode CT and the convergence electrode CE.

The X-ray generating apparatus 1 can further include a deflector 50 that deflects the electron beam EB emitted from the electron gun EG. The deflector 50 can be arranged outside the X-ray generating tube XG. For example, the deflector 50 can be arranged such that a virtual plane VP3 crossing the deflector 50 is positioned between a virtual plane VP1 including the electron beam incident surface (the surface facing the electron gun EG) of the target 22 and a virtual plane VP2 including the distal end face (the surface on the target 22 side) of the electron gun EG. The virtual planes VP1, VP2, and VP3 can be defined as planes vertically intersecting a central axis AX of the electron gun EG. The deflector 50 deflects the electron beam EB emitted from the electron gun EG by exerting an electric field on the electron beam. The amount of electron beam EB deflected by the deflector 50 can depend on the accelerating voltage.

The deflector 50 may be formed from a permanent magnet, an electromagnet, or a permanent magnet and an electromagnet. For example, the deflector 50 can include a first magnet and a second magnet. The first magnetic pole (for example, the S-pole) of the first magnet and the second magnetic pole (for example, the N-pole) of the second magnet can be arranged so as to face each other through the insulating tube 10 or the X-ray generating tube XG. The deflector 50 may be formed from one magnet arranged such that its magnetic pole faces in the radial direction of the insulating tube 10 or the X-ray generating tube XG.

The electrode 23 is electrically connected to the target 22 and supplies a potential to the target 22. When electrons from the electron gun EG collide with the target 22, X-rays are generated. The X-rays generated by the target 22 are transmitted through the target holding plate 21 and emitted outside the X-ray generating tube XG. The anode 20 can be maintained at, for example, the ground potential but may be maintained at another potential. The target 22 can be formed from a metal material. The target 22 is preferably formed from a material having a high melting point, for example, tungsten, tantalum, or molybdenum. These materials are advantageous in improving the generation efficiency of X-rays. The target holding plate 21 can be formed from, for example, a material that can easily transmit X-rays, such as beryllium or diamond.

The X-ray generating apparatus 1 can include an adjuster 60 for adjusting the deflection of the electron beam EB by the deflector 50 in accordance with the accelerating voltage or the amount of change in the accelerating voltage so as to reduce the change in the incident position of the electron beam EB onto the target 22 due to a change in accelerating voltage. In this case, as described above, the accelerating voltage is the voltage to be supplied between the anode 20 and the cathode CT by the cathode potential supply unit 41. Assume that the adjuster 60 does not exist. In this case, as the accelerating voltage changes, the electron beam EB emitted from the electron gun EG changes in the amount of deflection by the deflector 50. This can change the incident position of the electron beam EB onto the target 22. As the incident position of the electron beam EB onto the target 22 changes due to a change in accelerating voltage, the generation position of X-rays, that is, the focal position changes in the X-ray imaging apparatus incorporating the X-ray generating apparatus 1 and the X-ray detector. This change in focal position can request for the readjustment of the X-ray imaging apparatus (for example, the positioning of the X-ray detector with respect to the X-ray generating apparatus). The X-ray generating apparatus 1 according to this embodiment includes the adjuster 60 for reducing the change in the incident position of an electron beam onto the target 22 due to a change in accelerating voltage. The incident position of an electron beam onto the target 22 is a position on the plane (the virtual plane VP1) perpendicular to the central axis AX of the electron gun EG.

When the deflector 50 includes a magnet (a permanent magnet and/or electromagnet), the adjuster 60 can include an adjusting mechanism for adjusting the position of the magnet. The adjusting mechanism is a mechanical adjusting mechanism for adjusting the position of the magnet and can include, for example, an actuator that drives the deflector 50. The adjusting mechanism may include a guide that guides the deflector 50. The adjusting mechanism may include a fixing mechanism (for example, a screw and a spring) that fixes the deflector 50. The adjuster 60 can control the position of the magnet in accordance with an accelerating voltage or the amount of change in accelerating voltage so as to reduce the change in the incident position of the electron beam EB onto the target 22 due to a change in accelerating voltage. The control of the position of the magnet by the adjuster 60 can include the control of the position of the magnet in a direction parallel to the central axis AX of the electron gun EG. Alternatively, the control of the position of the magnet by the adjuster 60 can include the control of the distance between the magnet and a straight line including the central axis of the electron gun EG. Alternatively, the control of the position of the magnet by the adjuster 60 can include the control of the position of the magnet in a direction parallel to the central axis AX of the electron gun EG and the control of the distance between the magnet and the straight line including the central axis of the electron gun EG. Alternatively, the adjuster 60 may control the rotational angle of the magnet in accordance with an accelerating voltage or the amount of change in accelerating voltage so as to reduce the change in the incident position of the electron beam EB onto the target 22 due to a change in accelerating voltage. The adjustment of the rotational angle of the magnet by the adjuster 60 can include the adjustment of the rotational angle of the magnet around an axis perpendicular to the central axis AX of the electron gun EG. When the deflector 50 includes an electromagnet, the adjuster 60 may be configured to adjust the magnetic field (for example, the intensity of the magnetic field) generated by the electromagnet in accordance with an accelerating voltage or the amount of change in accelerating voltage.

Figure 2:
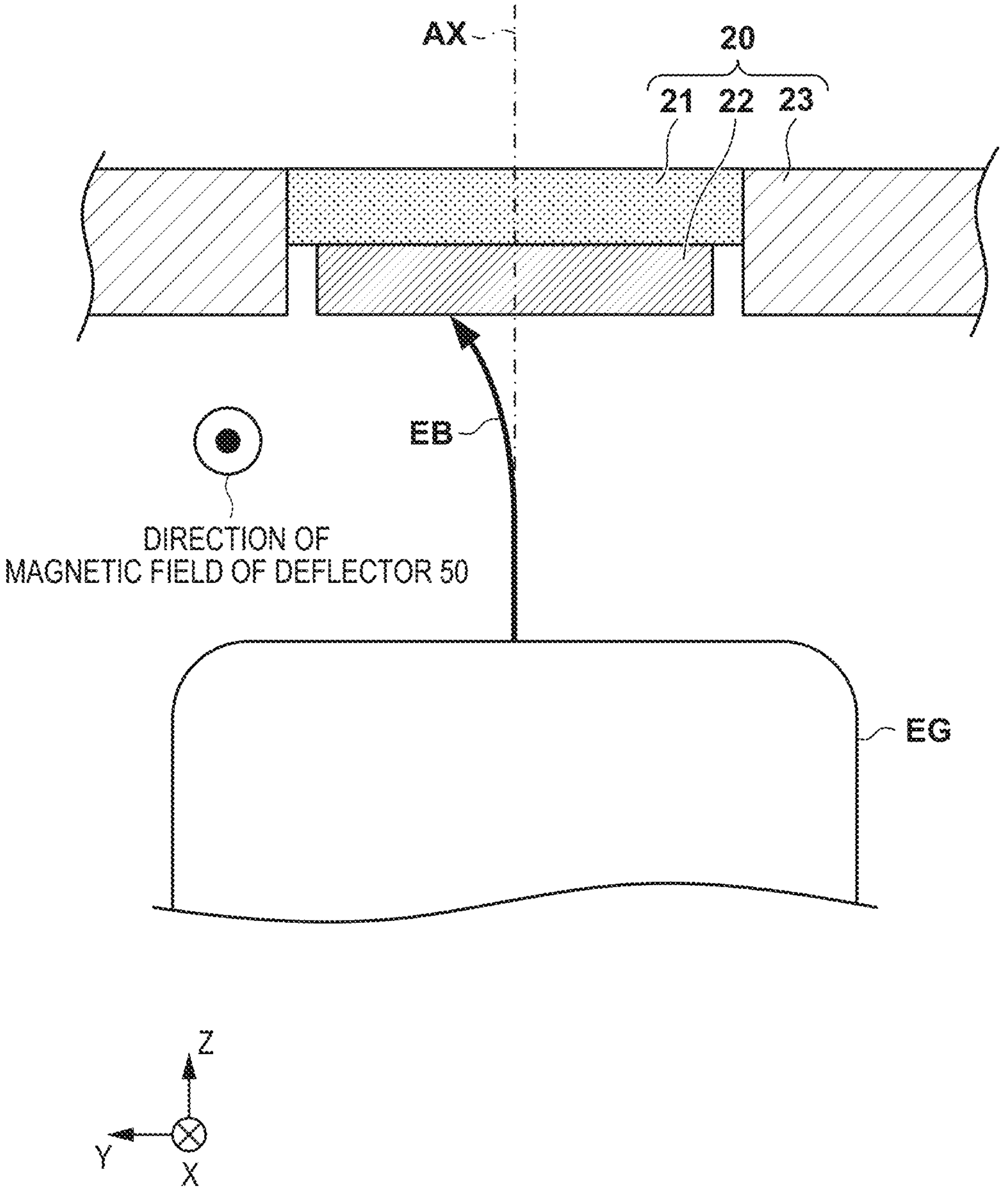
FIG. 2 is a view schematically showing how the electron beam emitted from an electron gun collides with a target.

FIG. 2 schematically shows how an electron beam EB emitted from the electron gun EG collides with the target 22. FIG. 2 shows the electron gun EG and the target 22 arranged close to each other. However, the electron gun EG and the target 22 can be arranged further separated from each other. The electron beam EB emitted from the electron gun EG strikes or collides with the target 22 after being deflected by the magnetic field generated by the deflector 50. The amount by which the electron beam EB is deflected, in other words, the incident position of the electron beam EB with respect to the target 22, can depend on the magnetic field that is generated by the deflector 50 and acts on the electron beam EB and the accelerating voltage.

As the accelerating voltage changes while the magnetic field (the strength and the direction) that is generated by the deflector 50 and acts on the electron beam EB is constant, the incident position of the electron beam EB with respect to the target 22 changes in accordance with a change in the accelerating voltage. In contrast, as the magnetic field (at least one of the strength and the direction) that is generated by the deflector 50 and acts on the electron beam EB changes, the incident position of the electron beam EB with respect to the target 22 changes in accordance with a change in the magnetic field. The adjuster 60 can adjust the deflection of the electron beam EB by the deflector 50 by adjusting the magnetic field that the deflector 50 makes act on the electron beam EB in accordance with the accelerating voltage or the amount of change in the accelerating voltage so as to reduce a change in the incident position of an electron beam onto the target 22 due to a change in accelerating voltage.

Figure 3:
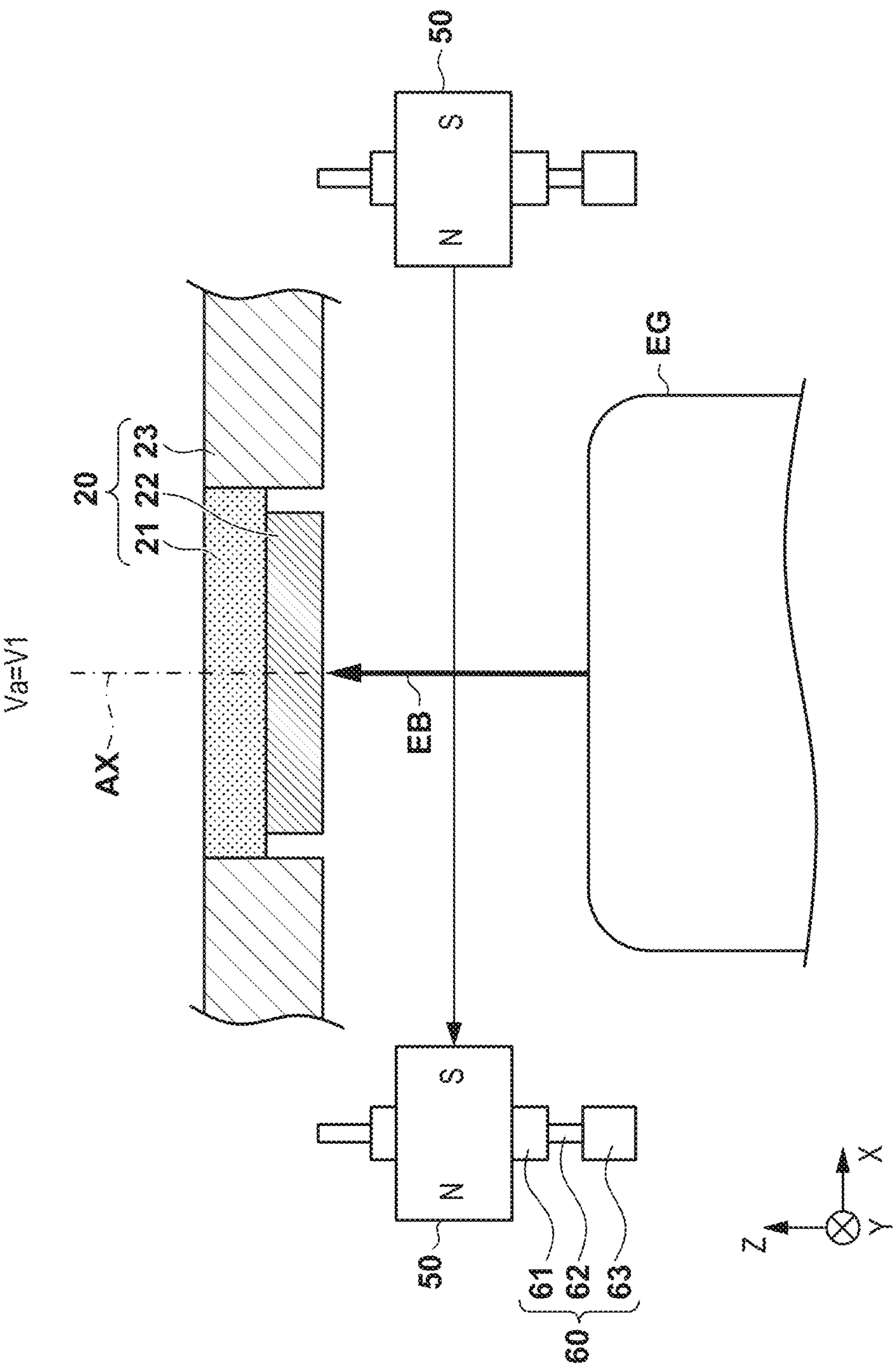
FIG. 3 is a view for explaining the first arrangement example of an X-ray generating apparatus.
Figure 4:
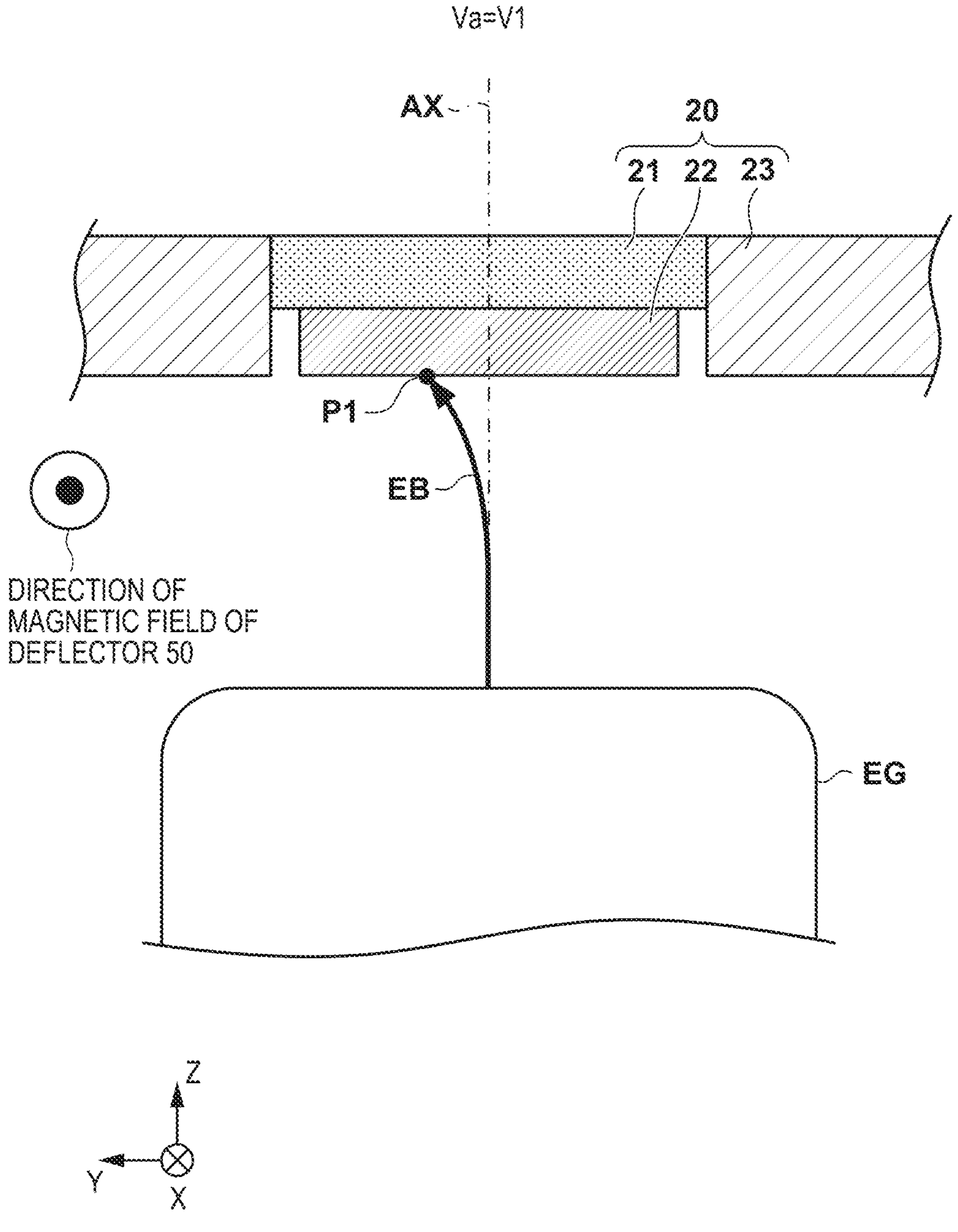
FIG. 4 is a view for explaining the first to fourth arrangement examples of the X-ray generating apparatus.

FIGS. 3, 4, 5, 6, 7, and 8 show the first arrangement example of the X-ray generating apparatus 1. FIGS. 3 and 4 schematically show the X-ray generating apparatus 1 when an accelerating voltage Va is a first voltage V1 and the adjustment of the electron beam EB by the adjuster 60 is in the first state. The deflector 50 can be configured by, for example, a pair of magnets arranged to face each other through the central axis AX. Each magnet may be a permanent magnet, an electromagnet, or a composite of a permanent magnet and an electromagnet. The adjuster 60 can include an adjusting mechanism for adjusting the position of the magnet as the deflector 50. The adjusting mechanism can include an actuator (for example, a motor) 63 that drives the deflector 50. The adjuster 60 may include an adaptor (holder) 61 as the adjusting mechanism which holds the deflector 50. In this case, the actuator 63 can be configured to drive the deflector 50 by driving the adaptor 61. The adjusting mechanism may include a guide 62 that guides the deflector 50 or the adaptor 61. The adjuster 60 can operate or can be controlled so as to adjust the position of the magnet as the deflector 50 in accordance with an accelerating voltage or the amount of change in accelerating voltage. In the first arrangement example, the control of the position of the magnet by the adjuster 60 includes the adjustment of the position of the magnet in a direction parallel to the central axis AX of the electron gun EG.

Figure 5:
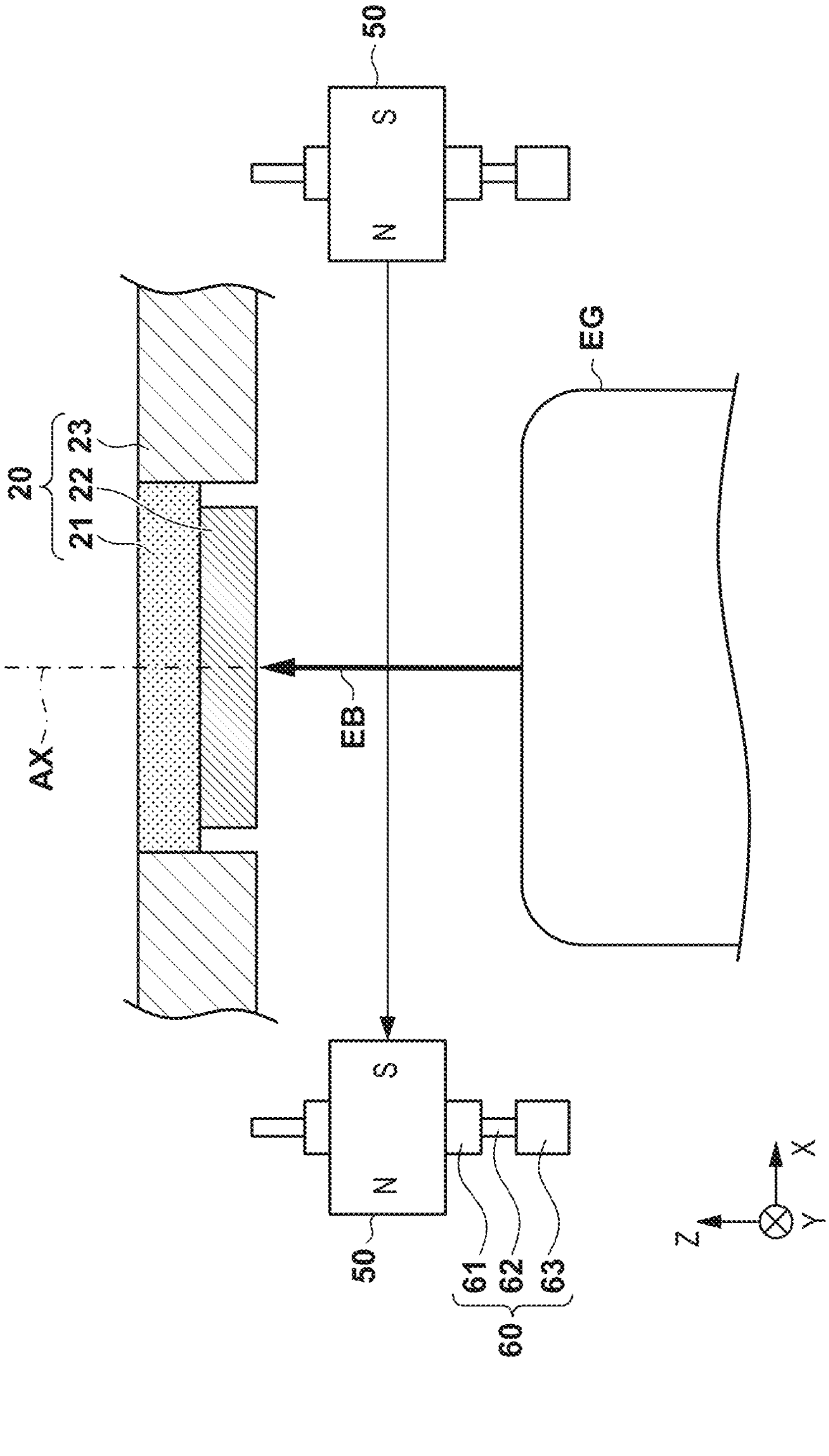
FIG. 5 is a view for explaining the first arrangement example of the X-ray generating apparatus.
Figure 6:
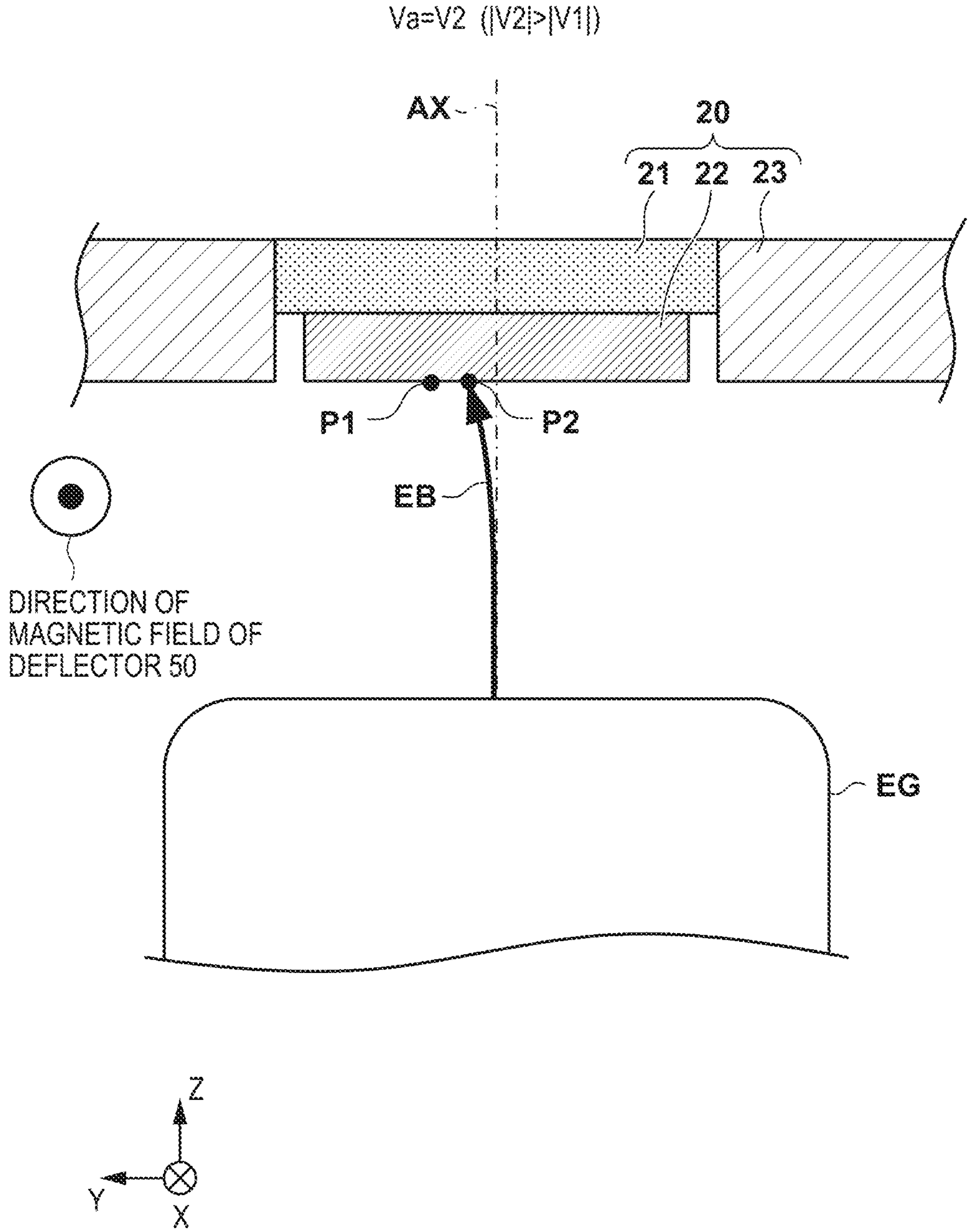
FIG. 6 is a view for explaining the first to fourth arrangement examples of the X-ray generating apparatus.
Figure 7:
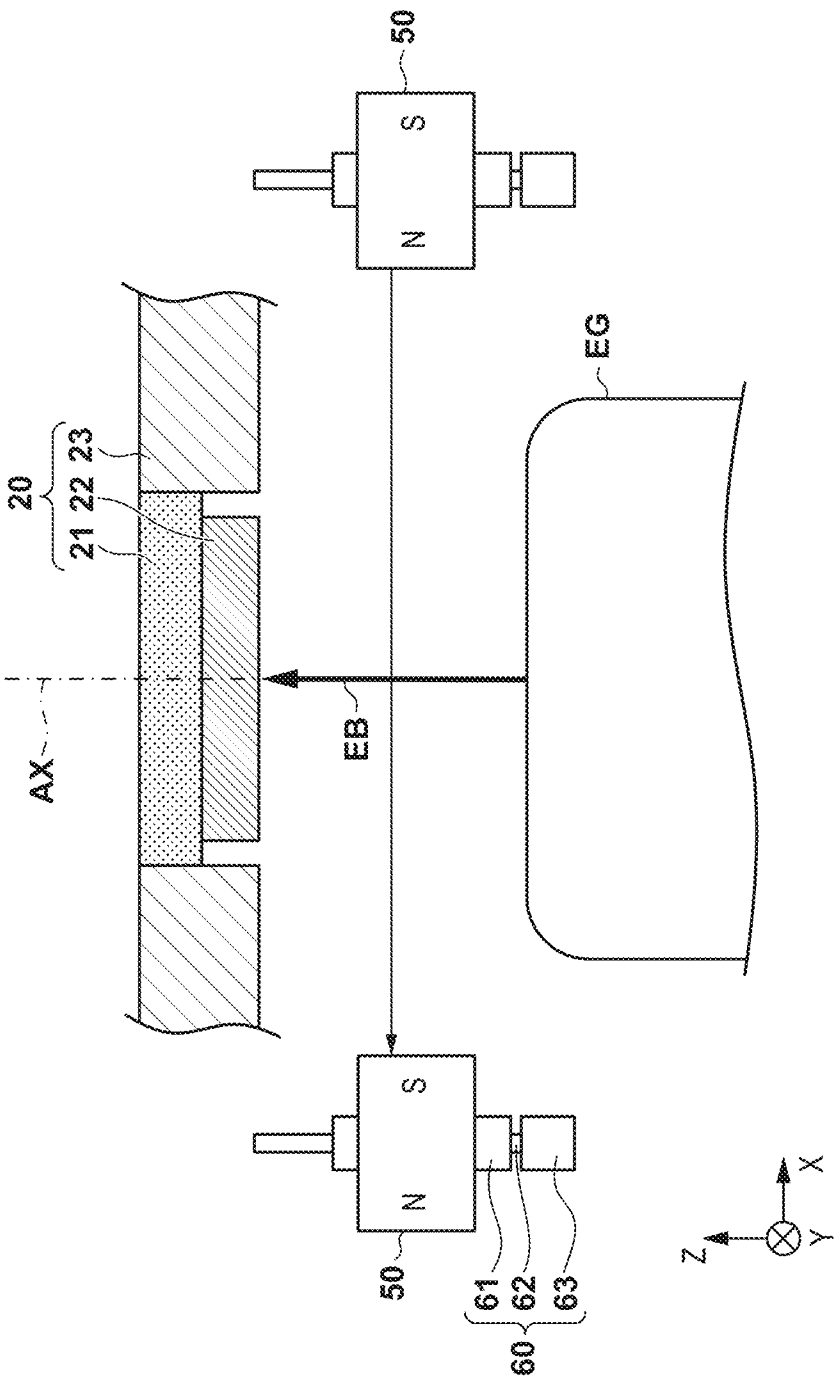
FIG. 7 is a view for explaining the first arrangement example of the X-ray generating apparatus.
Figure 8:
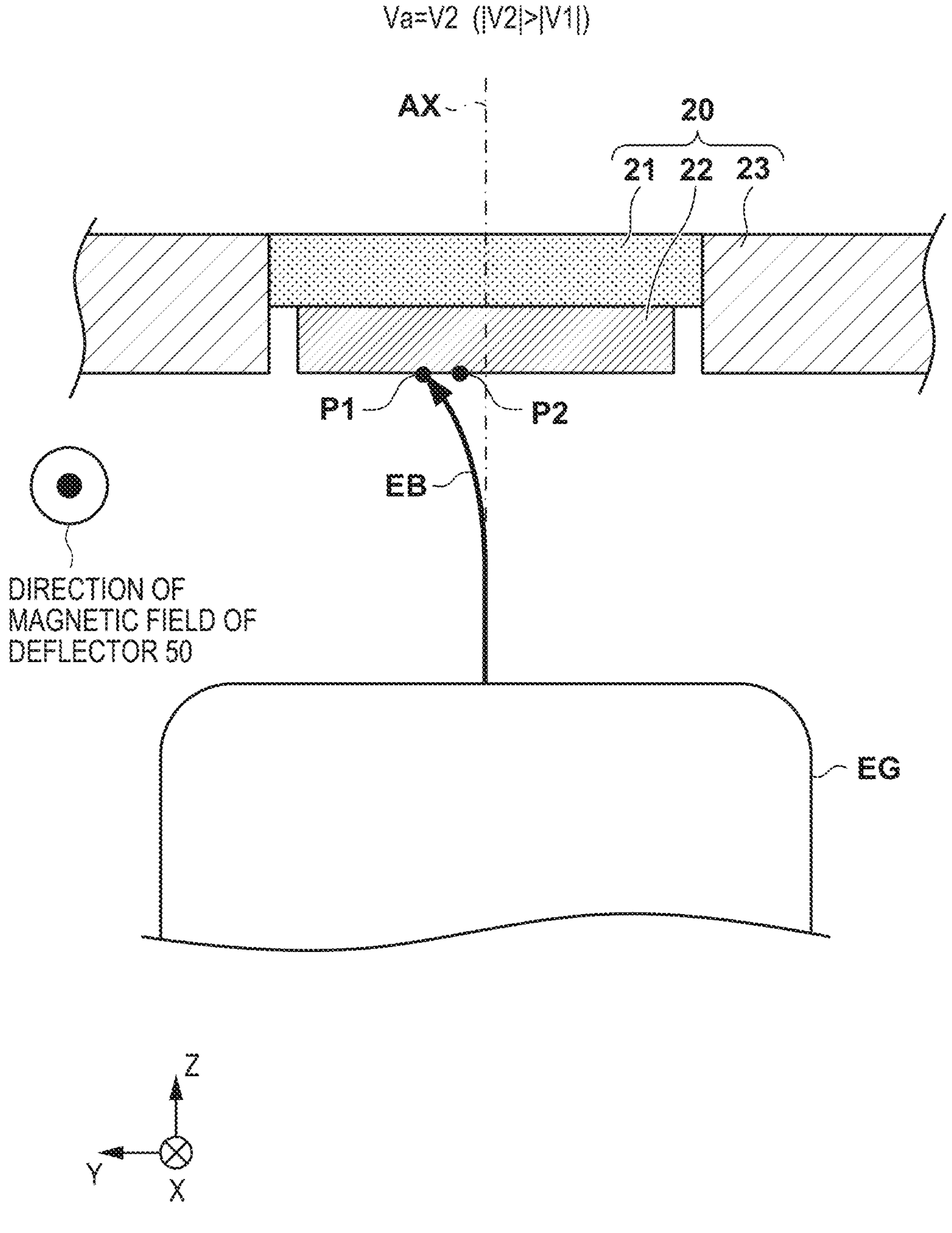
FIG. 8 is a view for explaining the first to fourth arrangement examples of the X-ray generating apparatus.

In the states shown in FIGS. 3 and 4, the electron beam EB emitted from the electron gun EG enters a first position P1 of the target 22. FIGS. 5 and 6 schematically show the X-ray generating apparatus 1 when the accelerating voltage Va is a second voltage V2 and the adjustment of the electron beam EB by the adjuster 60 is in the first state. In this case, the absolute value of the second voltage V2 is larger than the absolute value of the first voltage V1. Note that an accelerating voltage may be determined as the value obtained by subtracting the potential of the cathode CT from the potential of the anode 20, that is, a positive value, or the value obtained by subtracting the potential of the anode 20 from the potential of the cathode CT, that is, a negative value. In the states shown in FIGS. 5 and 6, the electron beam EB emitted from the electron gun EG enters a second position P2 of the target 22. The second position P2 is closer to the straight line including the central axis AX of the electron gun EG than the first position P1. That is, the distance between the second position P2 and the central axis AX is smaller than the distance between the first position P1 and the central axis AX. FIGS. 7 and 8 schematically show the X-ray generating apparatus 1 when the accelerating voltage Va is the second voltage V2 and the adjustment of the electron beam EB by the adjuster 60 is in the second state. The second state of the adjustment of the electron beam EB by the adjuster 60 is preferably a state in which the electron beam EB is adjusted by the adjuster 60 so as to make the incident position of the electron beam EB onto the target 22 is the first position P1. The second state of the adjuster 60 is a state in which the deflection of the electron beam EB by the deflector 50 is adjusted by the adjuster 60 in accordance with the accelerating voltage Va (=V2) or the amount of change in accelerating voltage (=V1-V2) so as to reduce the change in the incident position (that is, the change from the first position P1 to the second position P2) of the electron beam EB of the target 22 due to the change in the accelerating voltage Va from the first voltage V1 to the second voltage V2.

The adjustment of the deflection of the electron beam EB by the adjuster 60 described above can be understood as the maintenance of the incident position of the electron beam EB onto the target 22 within a target region regardless of a change in the accelerating voltage Va. The target region preferably has, for example, a diameter equal to or less than the triple of the diameter of the electron beam EB at the target 22. Setting a target region in this manner and adjusting the target region using the adjuster 60 will eliminate the necessity of the operation of positioning the X-ray detector with respect to the X-ray generating apparatus in accordance with an accelerating voltage.

In the first arrangement example, when the accelerating voltage Va is changed in a direction to increase the absolute value of the accelerating voltage Va, the adjuster 60 adjusts the position of the deflector 50 in a direction in which the deflector 50 moves away from the target 22 in a direction parallel to the straight line including the central axis AX. On the other hand, in the first arrangement example, when the accelerating voltage Va is changed in a direction to reduce the absolute value of the accelerating voltage Va, the adjuster 60 adjusts the position of the deflector 50 in a direction in which the deflector 50 approaches the target 22 in a direction parallel to the straight line including the central axis AX.

The position of the deflector 50 can be adjusted in accordance with the accelerating voltage Va or the amount of change in accelerating voltage by, for example, obtaining, in advance by experiment or calculation, the relationship between the magnitude of the accelerating voltage Va or the amount of change in accelerating voltage and the position of the deflector 50 which is proper for making the electron beam EB enter the target region of the target 22 and using the obtained relationship as a basis. Alternatively, it is possible to adjust the position of the deflector 50 in accordance with the accelerating voltage Va or the amount of change in accelerating voltage using the adjuster 60 so as to make the electron beam EB enter the target region of the target 22 while monitoring the incident position of the electron beam EB with respect to the target 22 by using the X-ray detector or the like.

Figure 9:
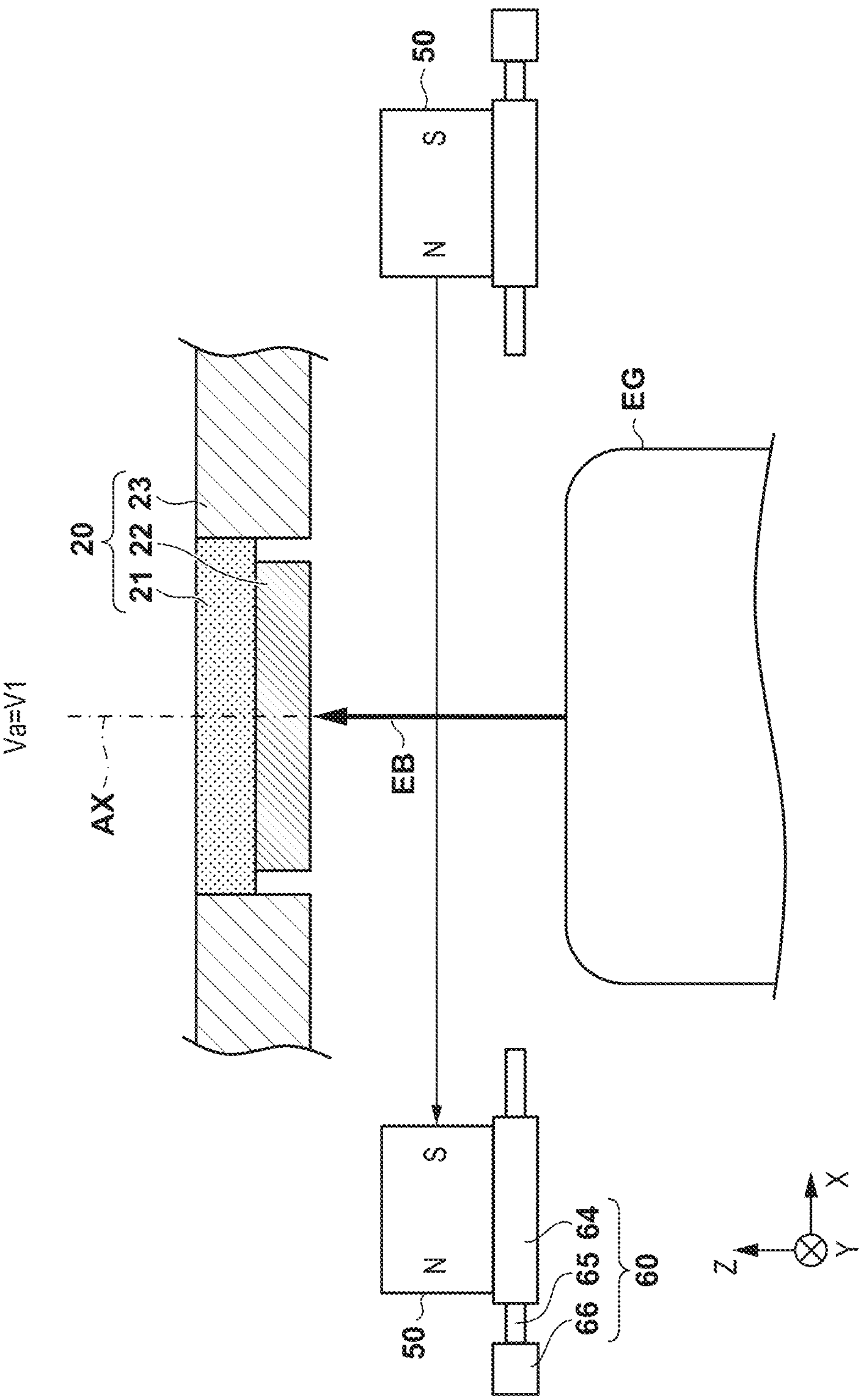
FIG. 9 is a view for explaining the second arrangement example of the X-ray generating apparatus.

FIGS. 9, 10, 11, 4, 6, and 8 show the second arrangement example of the X-ray generating apparatus 1. FIGS. 9 and 4 schematically show the X-ray generating apparatus 1 when the accelerating voltage Va is the first voltage V1 and the adjustment of the electron beam EB by the adjuster 60 is in the first state. The deflector 50 can be configured by, for example, a pair of magnets arranged to face each other through the central axis AX. Each magnet may be a permanent magnet, an electromagnet, or a composite of a permanent magnet and an electromagnet. The adjuster 60 can include an adjusting mechanism for adjusting the position of the magnet as the deflector 50. The adjusting mechanism can include an actuator (for example, a motor) 66 that drives the deflector 50. The adjusting mechanism may include an adaptor (holder) 64 that holds the deflector 50. In this case, the actuator 66 can be configured to drive the deflector 50 by driving the adaptor 64. The adjusting mechanism may include a guide 65 that guides the deflector 50 or the adaptor 64. The adjuster 60 can operate or can be controlled so as to adjust the position of the magnet as the deflector 50 in accordance with an accelerating voltage or the amount of change in accelerating voltage. In the second arrangement example, the control of the position of the magnet by the adjuster 60 includes the adjustment of the position of the magnet in a direction parallel to the distance between the magnet and the straight line including the central axis ax of the electron gun EG. The second arrangement example may be combined with the first arrangement example. That is, the control of the position of the magnet by the adjuster 60 may include the adjustment of the position of the magnet in a direction parallel to the central axis AX of the electron gun EG and the adjustment of the distance between the magnet and the straight line including the central axis AX of the electron gun EG.

Figure 10:
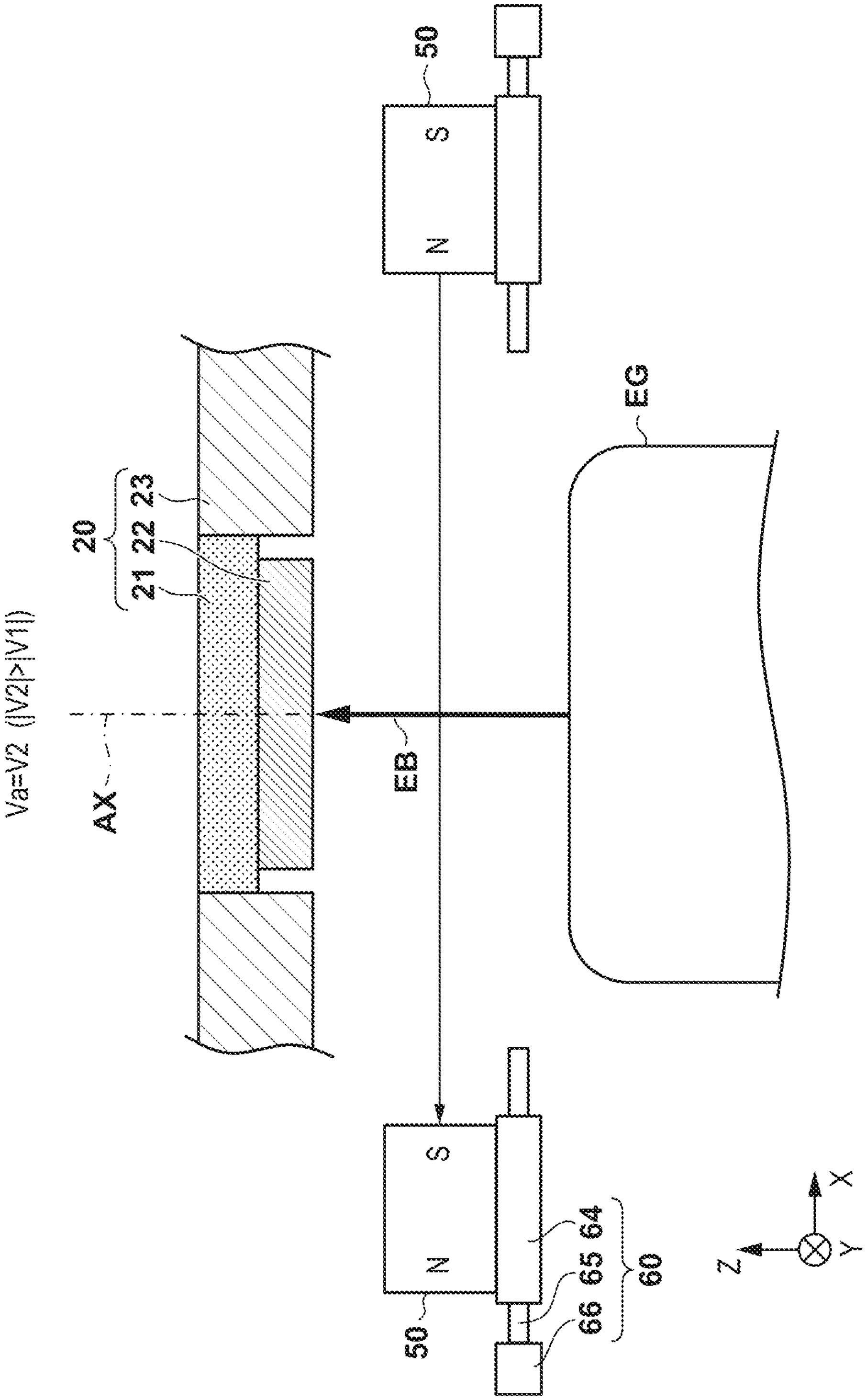
FIG. 10 is a view for explaining the second arrangement example of the X-ray generating apparatus.

In the states shown in FIGS. 9 and 4, the electron beam EB emitted from the electron gun EG enters the first position P1 of the target 22. FIGS. 10 and 6 schematically show the X-ray generating apparatus 1 when the accelerating voltage Va is the second voltage V2 and the adjustment of the electron beam EB by the adjuster 60 is in the first state. In this case, the absolute value of the second voltage V2 is larger than the absolute value of the first voltage V1. In the states shown in FIGS. 10 and 6, the electron beam EB emitted from the electron gun EG enters the second position P2 of the target 22. The second position P2 is closer to the straight line including the central axis AX of the electron gun EG than the first position P1. That is, the distance between the second position P2 and the straight line including the central axis AX is smaller than the distance between the first position P1 and the straight line including the central axis AX.

Figure 11:
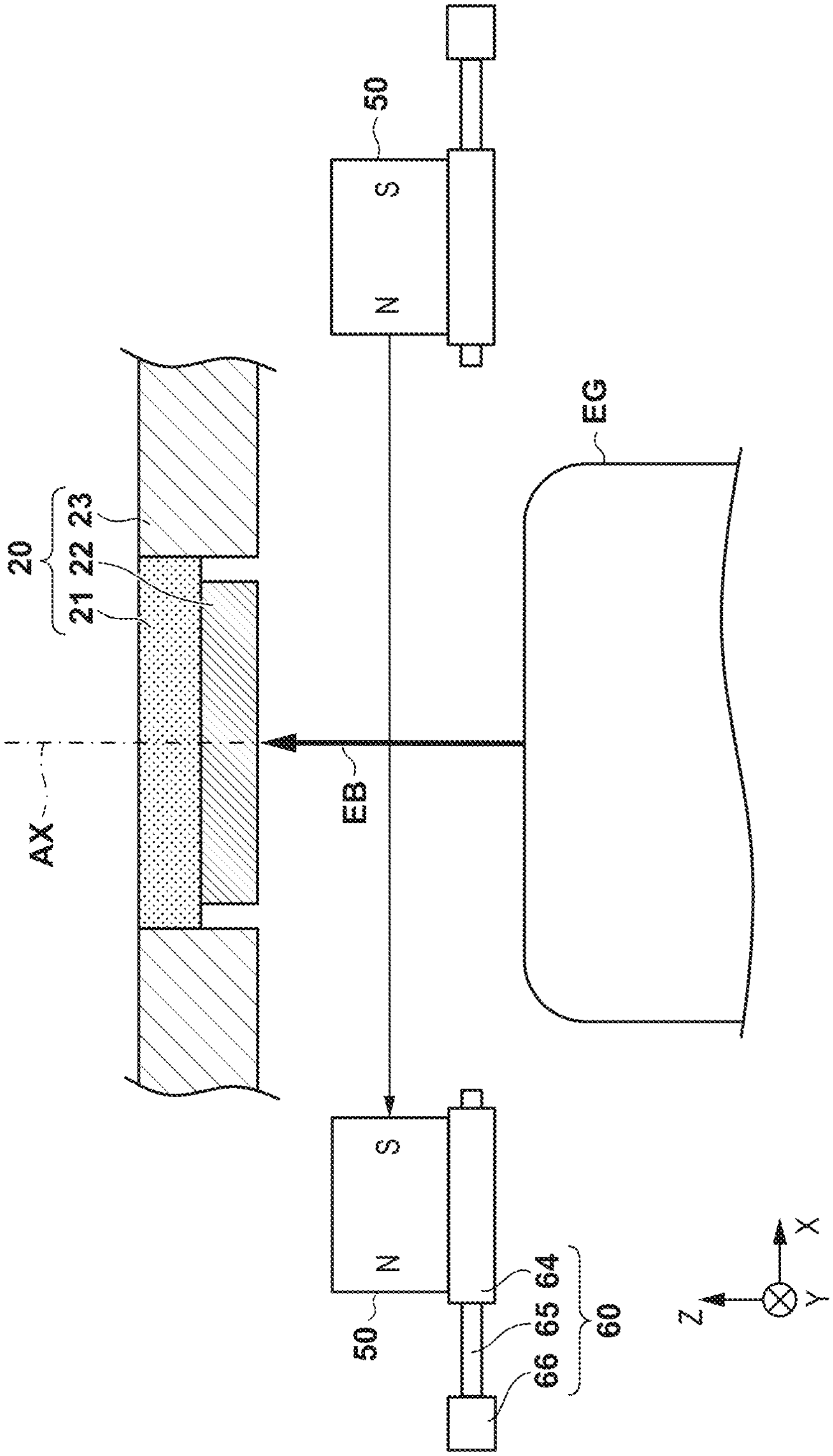
FIG. 11 is a view for explaining the second arrangement example of the X-ray generating apparatus.

FIGS. 11 and 8 schematically show the X-ray generating apparatus 1 when the accelerating voltage Va is the second voltage V2 and the adjustment of the electron beam EB by the adjuster 60 is in the second state. The second state of the adjustment of the electron beam EB by the adjuster 60 is a state in which the electron beam EB is adjusted by the adjuster 60 such that the incident position of the electron beam EB onto the target 22 is the first position P1. The second state of the adjuster 60 is a state in which the deflection of the electron beam EB by the deflector 50 is adjusted by the adjuster 60 in accordance with the accelerating voltage Va (=V2) or the amount of change (=V1-V2) in accelerating voltage so as to reduce the change (that is, the change from the first position P1 to the second position P2) in the incident position of the electron beam EB onto the target 22 due to the change in the accelerating voltage Va from the first voltage V1 to the second voltage V2.

The adjustment of the deflection of the electron beam EB by the adjuster 60 described above can be understood as the maintenance of the incident position of the electron beam EB onto the target 22 within a target region regardless of a change in the accelerating voltage Va. The target region preferably has, for example, a diameter equal to or less than the triple of the diameter of the electron beam EB at the target 22.

In the second arrangement example, when the accelerating voltage Va is changed in a direction to increase the absolute value of the accelerating voltage Va, the adjuster 60 adjusts the position of the deflector 50 so as to make the deflector 50 approach the straight line including the central axis AX. On the other hand, in the second arrangement example, when the accelerating voltage Va is changed in a direction to reduce the absolute value of the accelerating voltage Va, the adjuster 60 adjusts the position of the deflector 50 so as to make the deflector 50 move away from the straight line including the central axis AX.

The position of the deflector 50 can be adjusted in accordance with the accelerating voltage Va or the amount of change in accelerating voltage by, for example, obtaining, in advance by experiment or calculation, the relationship between the magnitude of the accelerating voltage Va or the amount of change in accelerating voltage and the position of the deflector 50 which is proper for making the electron beam EB enter the target region of the target 22 and using the obtained relationship as a basis. Alternatively, it is possible to adjust the position of the deflector 50 in accordance with the accelerating voltage Va or the amount of change in accelerating voltage using the adjuster 60 so as to make the electron beam EB enter the target region of the target 22 while monitoring the incident position of the electron beam EB with respect to the target 22 by using the X-ray detector or the like.

Figure 12:
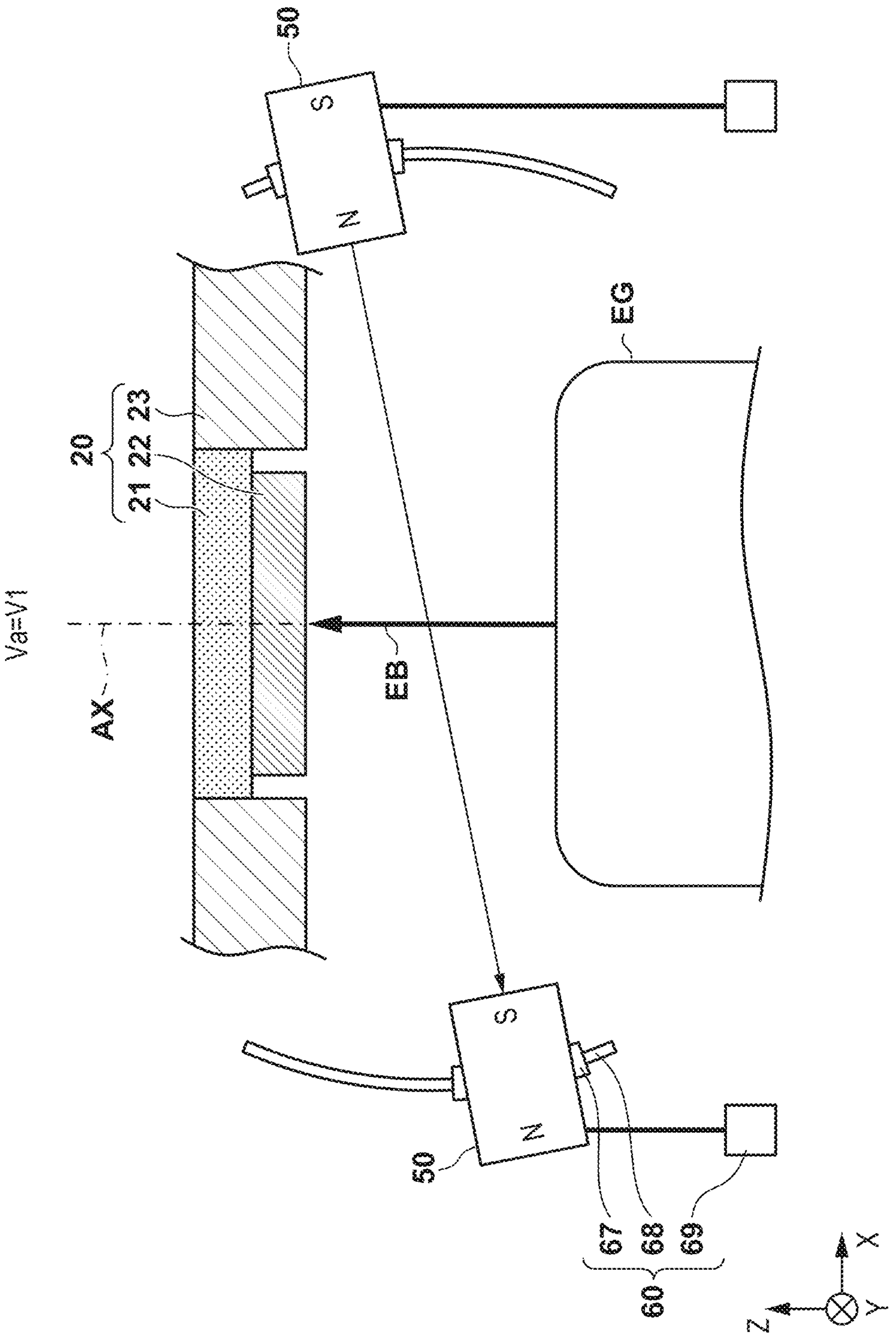
FIG. 12 is a view for explaining the third arrangement example of the X-ray generating apparatus.

FIGS. 12, 13, 14, 4, 6, and 8 show the third arrangement example of the X-ray generating apparatus 1. FIGS. 12 and 4 schematically show the X-ray generating apparatus 1 when the accelerating voltage Va is the first voltage V1 and the adjustment of the electron beam EB by the adjuster 60 is in the first state. The deflector 50 can be configured by, for example, a pair of magnets arranged to face each other through the central axis AX. Each magnet may be a permanent magnet, an electromagnet, or a composite of a permanent magnet and an electromagnet. The adjuster 60 can include an adjusting mechanism for adjusting the position of the magnet as the deflector 50. The adjusting mechanism can include an actuator (for example, a motor) 69 that drives the deflector 50. The adjusting mechanism may include an adaptor (holder) 67 that holds the deflector 50. In this case, the actuator 69 can be configured to drive the deflector 50 by driving the adaptor 67. The adjusting mechanism may include a guide 68 that guides the deflector 50 or the adaptor 67. The adjuster 60 can operate or can be controlled so as to adjust the rotational angle of the magnet as the deflector 50 in accordance with an accelerating voltage or the amount of change in accelerating voltage. The control of the rotational angle of the magnet by the adjuster 60 can include the adjustment of the rotational angle of the magnet around an axis perpendicular to the central axis AX of the electron gun EG. The third arrangement example may be used in combination with at least one of the first and second arrangement examples.

Figure 13:
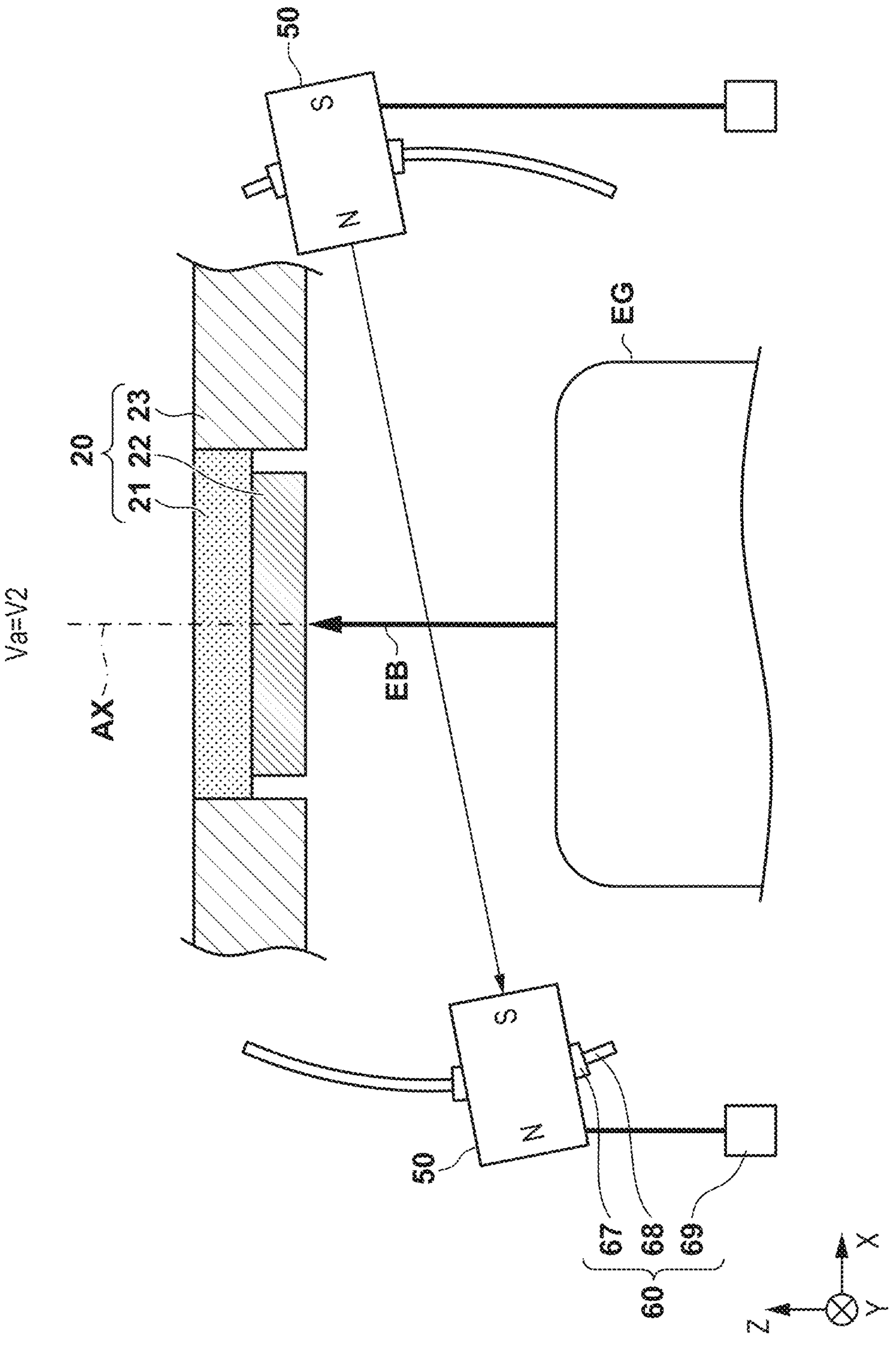
FIG. 13 is a view for explaining the third arrangement example of the X-ray generating apparatus.

In the states shown in FIGS. 12 and 4, the electron beam EB emitted from the electron gun EG enters the first position P1 of the target 22. FIGS. 13 and 6 schematically show the X-ray generating apparatus 1 when the accelerating voltage Va is the second voltage V2 and the adjustment of the electron beam EB by the adjuster 60 is in the first state. In this case, the absolute value of the second voltage V2 is larger than the absolute value of the first voltage V1. In the states shown in FIGS. 13 and 6, the electron beam EB emitted from the electron gun EG enters the second position P2 of the target 22. The second position P2 is closer to the straight line including the central axis AX of the electron gun EG than the first position P1. That is, the distance between the second position P2 and the straight line including the central axis AX is smaller than the distance between the first position P1 and the straight line including the central axis AX.

Figure 14:
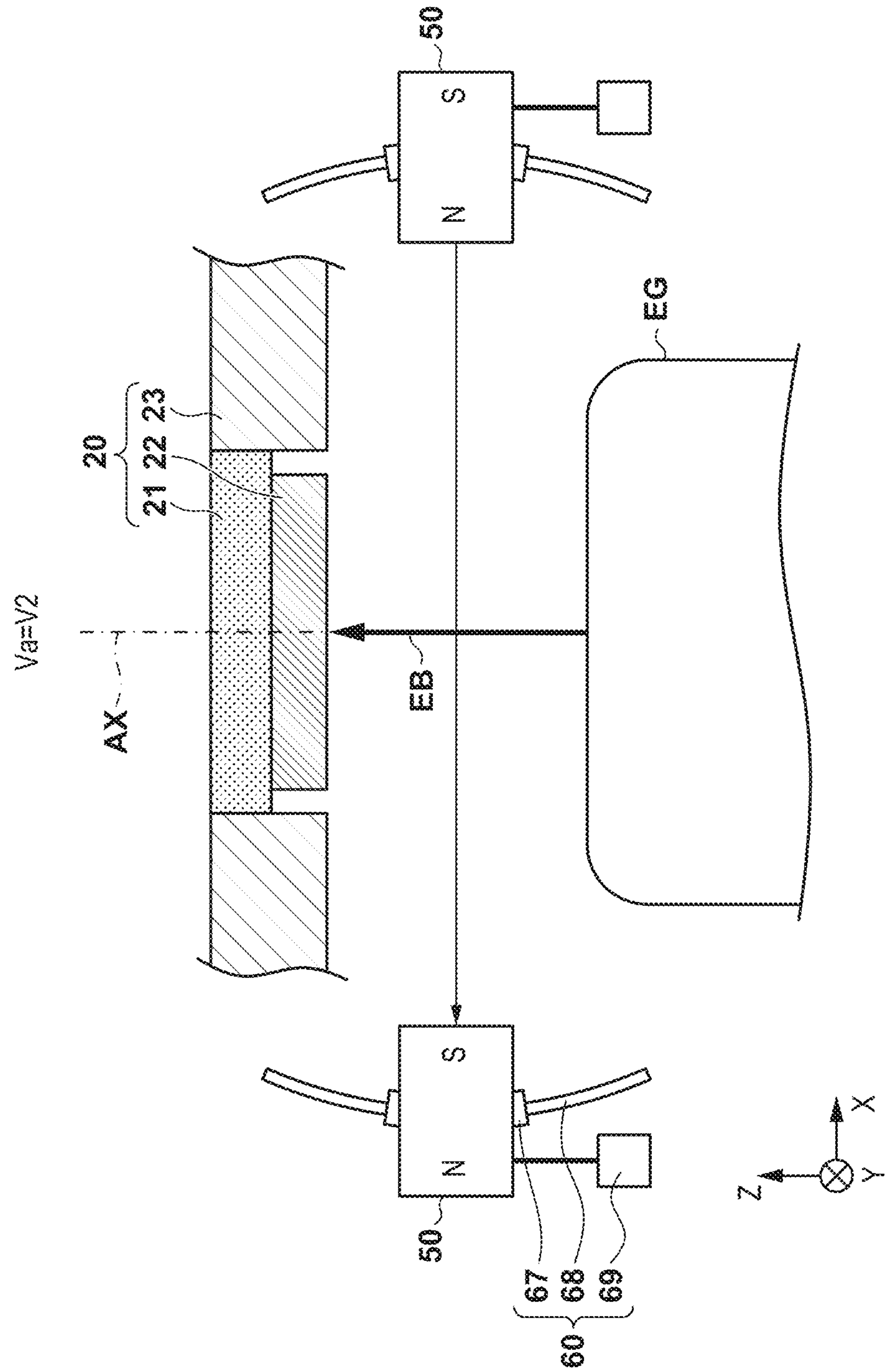
FIG. 14 is a view for explaining the third arrangement example of the X-ray generating apparatus.

FIGS. 14 and 8 schematically show the X-ray generating apparatus 1 when the accelerating voltage Va is the second voltage V2 and the adjustment of the electron beam EB by the adjuster 60 is in the second state. The second state of the adjustment of the electron beam EB by the adjuster 60 is a state in which the electron beam EB is adjusted by the adjuster 60 such that the incident position of the electron beam EB onto the target 22 is the first position P1. The second state of the adjuster 60 is a state in which the deflection of the electron beam EB by the deflector 50 is adjusted by the adjuster 60 in accordance with the accelerating voltage Va (=V2) or the amount of change (=V1-V2) in accelerating voltage so as to reduce the change (that is, the change from the first position P1 to the second position P2) in the incident position of the electron beam EB onto the target 22 due to a change in the accelerating voltage Va from the first voltage V1 to the second voltage V2.

The adjustment of the deflection of the electron beam EB by the adjuster 60 described above can be understood as the maintenance of the incident position of the electron beam EB onto the target 22 within a target region regardless of a change in the accelerating voltage Va. The target region preferably has, for example, a diameter equal to or less than the triple of the diameter of the electron beam EB at the target 22.

In the third arrangement example, when the accelerating voltage Va is changed in a direction to increase the absolute value of the accelerating voltage Va, the adjuster 60 adjusts the rotational angle of the deflector 50 so as to increase the magnetic field of the vertical component acting on the electron beam EB. On the other hand, in the third arrangement example, when the accelerating voltage Va is changed in a direction to reduce the absolute value of the accelerating voltage Va, the adjuster 60 adjusts the rotational angle of the deflector 50 so as to reduce the magnetic field of the vertical component acting on the electron beam EB.

The rotational angle of the deflector 50 can be adjusted in accordance with the accelerating voltage Va or the amount of change in accelerating voltage by, for example, obtaining, in advance by experiment or calculation, the relationship between the magnitude of the accelerating voltage Va or the amount of change in accelerating voltage and the rotational angle of the deflector 50 which is proper for making the electron beam EB enter the target region of the target 22 and using the obtained relationship as a basis. Alternatively, it is possible to adjust the rotational angle of the deflector 50 in accordance with the accelerating voltage Va or the amount of change in accelerating voltage using the adjuster 60 so as to make the electron beam EB enter the target region of the target 22 while monitoring the incident position of the electron beam EB with respect to the target 22 by using the X-ray detector or the like.

Figure 15:
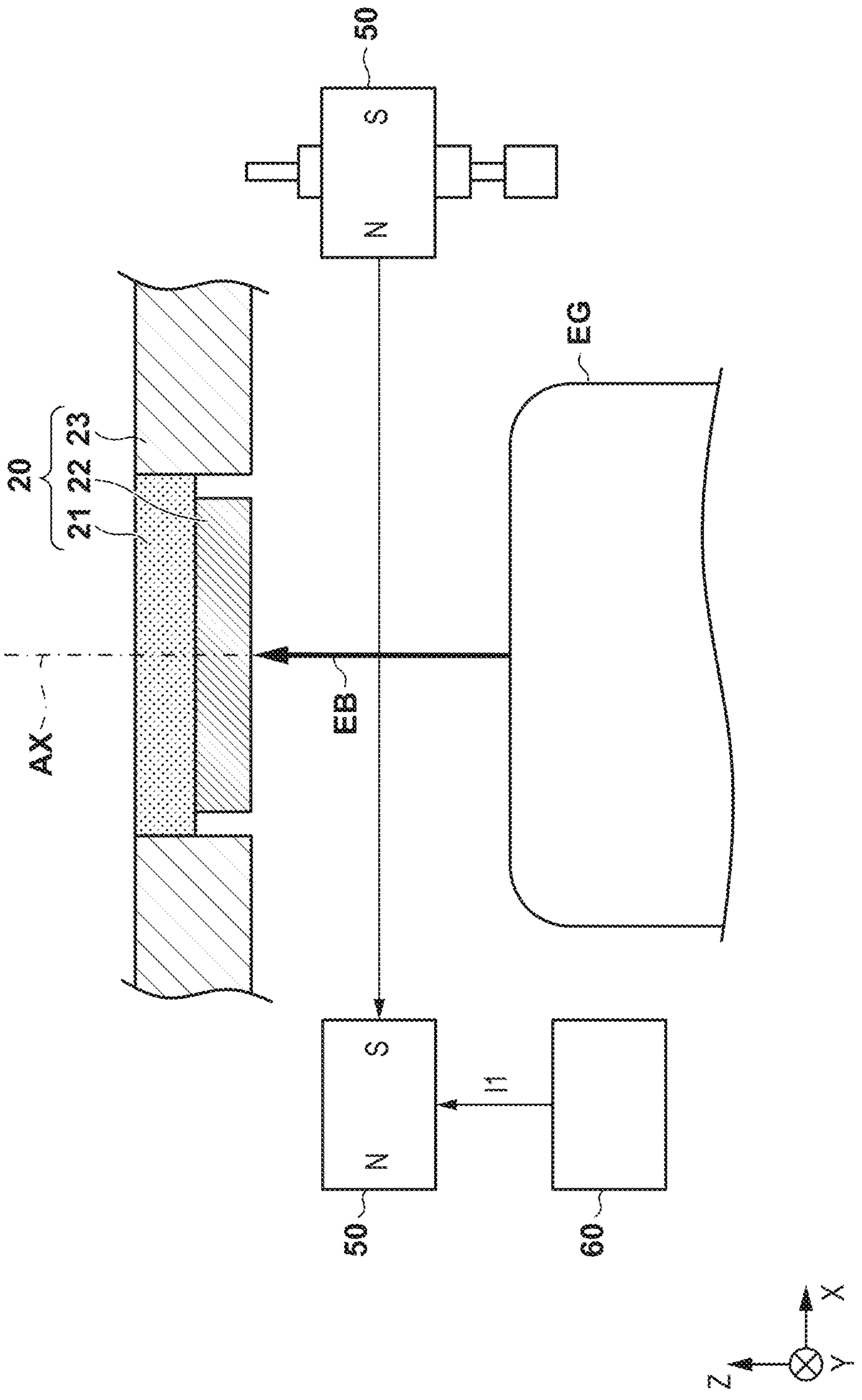
FIG. 15 is a view for explaining the fourth arrangement example of the X-ray generating apparatus.

FIGS. 15, 16, 17, 4, 6, and 8 show the fourth arrangement example of the X-ray generating apparatus 1. FIGS. 15 and 4 schematically show the X-ray generating apparatus 1 when the accelerating voltage Va is the first voltage V1 and the adjustment of the electron beam EB by the adjuster 60 is in the first state. The deflector 50 can be configured by, for example, a pair of magnets arranged to face each other through the central axis AX. Each magnet includes at least an electromagnet. The adjuster 60 can be configured to control the current to be supplied to the electromagnet constituting the deflector 50. The adjuster 60 can be configured to adjust the magnetic field generated by the electromagnet constituting the deflector 50 in accordance with an accelerating voltage or the amount of change in accelerating voltage. The adjuster 60 can control the current to be supplied to the electromagnet constituting the deflector 50 in accordance with an accelerating voltage. The fourth arrangement example may be used in combination with at least one of the first to third arrangement examples.

Figure 16:
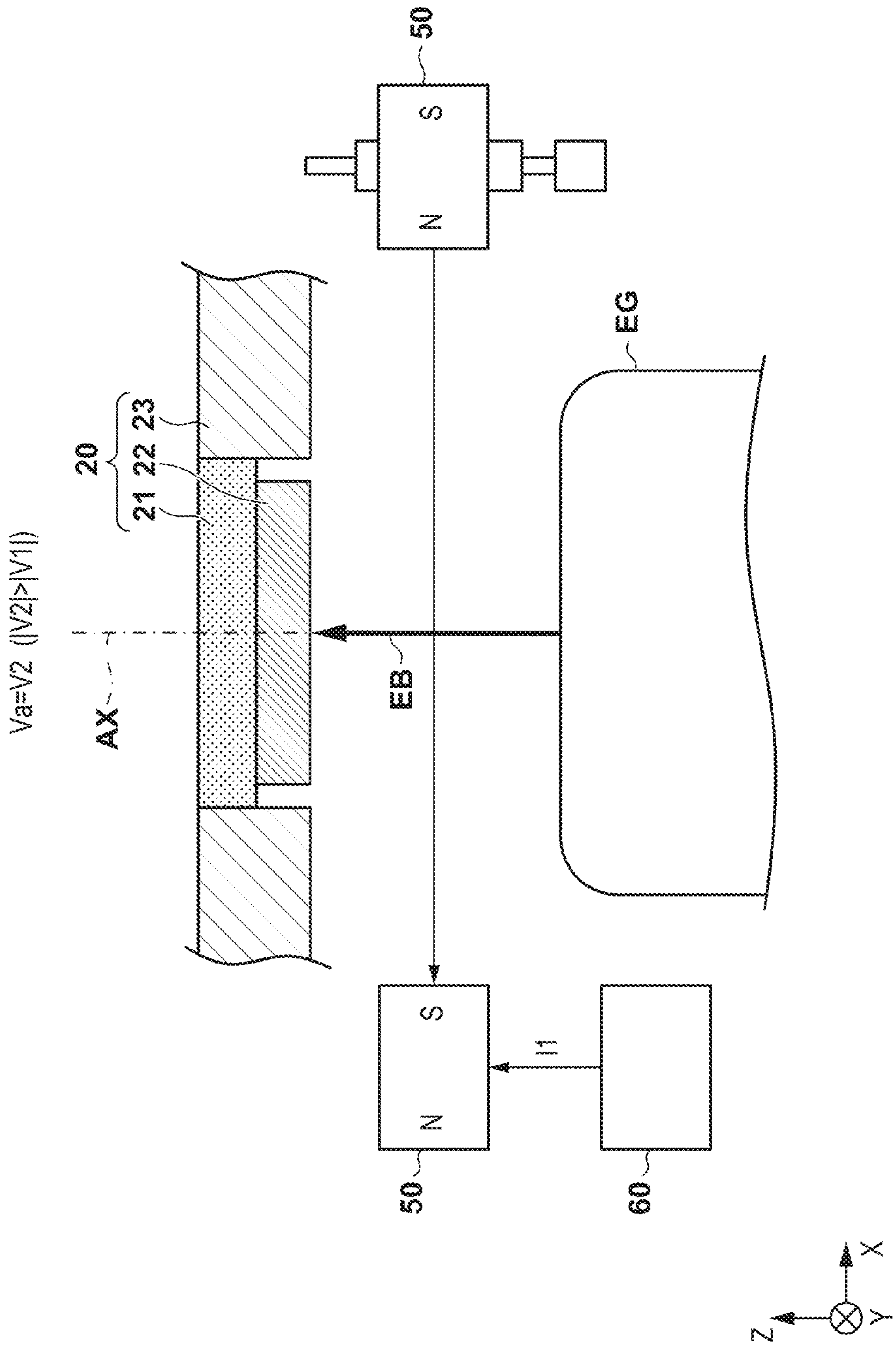
FIG. 16 is a view for explaining the fourth arrangement example of the X-ray generating apparatus.

In the states shown in FIGS. 15 and 4, the electron beam EB emitted from the electron gun EG enters the first position P1 of the target 22. FIGS. 16 and 6 schematically show the X-ray generating apparatus 1 when the accelerating voltage Va is the second voltage V2 and the adjustment of the electron beam EB by the adjuster 60 is in the first state. In this case, the absolute value of the second voltage V2 is larger than the absolute value of the first voltage V1. In the states shown in FIGS. 16 and 6, the electron beam EB emitted from the electron gun EG enters the second position P2 of the target 22. The second position P2 is closer to the straight line including the central axis AX of the electron gun EG than the first position P1. That is, the distance between the second position P2 and the straight line including the central axis AX is smaller than the distance between the first position P1 and the straight line including the central axis AX.

Figure 17:
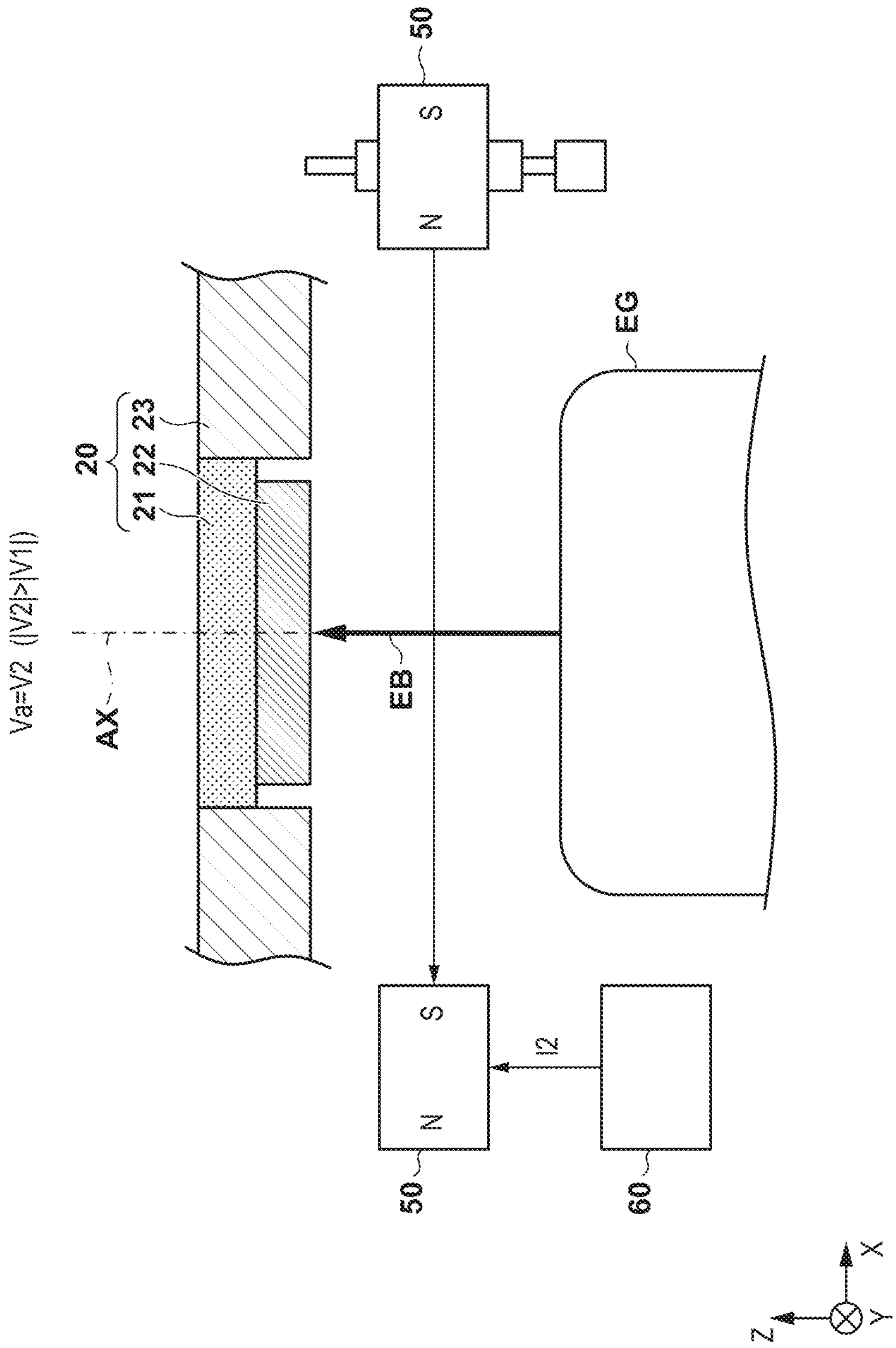
FIG. 17 is a view for explaining the fifth arrangement example of the X-ray generating apparatus.

FIGS. 17 and 8 schematically show the X-ray generating apparatus 1 when the accelerating voltage Va is the second voltage V2 and the adjustment of the electron beam EB by the adjuster 60 is in the second state. The second state of the adjustment of the electron beam EB by the adjuster 60 is a state in which the electron beam EB is adjusted by the adjuster 60 such that the incident position of the electron beam EB onto the target 22 is the first position P1. The second state of the adjuster 60 is a state in which the deflection of the electron beam EB by the deflector 50 is adjusted by the adjuster 60 in accordance with the accelerating voltage Va (=V2) or the amount of change (=V1-V2) in accelerating voltage so as to reduce the change (that is, the change from the first position P1 to the second position P2) in the incident position of the electron beam EB onto the target 22 due to a change in the accelerating voltage Va from the first voltage V1 to the second voltage V2.

The adjustment of the deflection of the electron beam EB by the adjuster 60 described above can be understood as the maintenance of the incident position of the electron beam EB onto the target 22 within a target region regardless of a change in the accelerating voltage Va. The target region preferably has, for example, a diameter equal to or less than the triple of the diameter of the electron beam EB at the target 22.

In the fourth arrangement example, when the accelerating voltage Va is changed in a direction to increase the absolute value of the accelerating voltage Va, the adjuster 60 increases the magnitude of the current to be supplied to the electromagnet constituting the deflector 50. On the other hand, in the fourth arrangement example, when the accelerating voltage Va is changed in a direction to reduce the absolute value of the accelerating voltage Va, the adjuster 60 reduces the magnitude of the current to be supplied to the electromagnet constituting the deflector 50.

The position of the deflector 50 can be adjusted in accordance with the accelerating voltage Va or the amount of change in accelerating voltage by, for example, obtaining, in advance by experiment or calculation, the relationship between the magnitude of the accelerating voltage Va or the amount of change in accelerating voltage and the magnitude of the current to be supplied to the deflector 50 to make the electron beam EB enter the target region of the target 22 and using the obtained relationship as a basis. Alternatively, it is possible to adjust the position of the deflector 50 in accordance with the accelerating voltage Va or the amount of change in accelerating voltage using the adjuster 60 so as to make the electron beam EB enter the target region of the target 22 while monitoring the incident position of the electron beam EB with respect to the target 22 by using the X-ray detector or the like.

Figure 18:
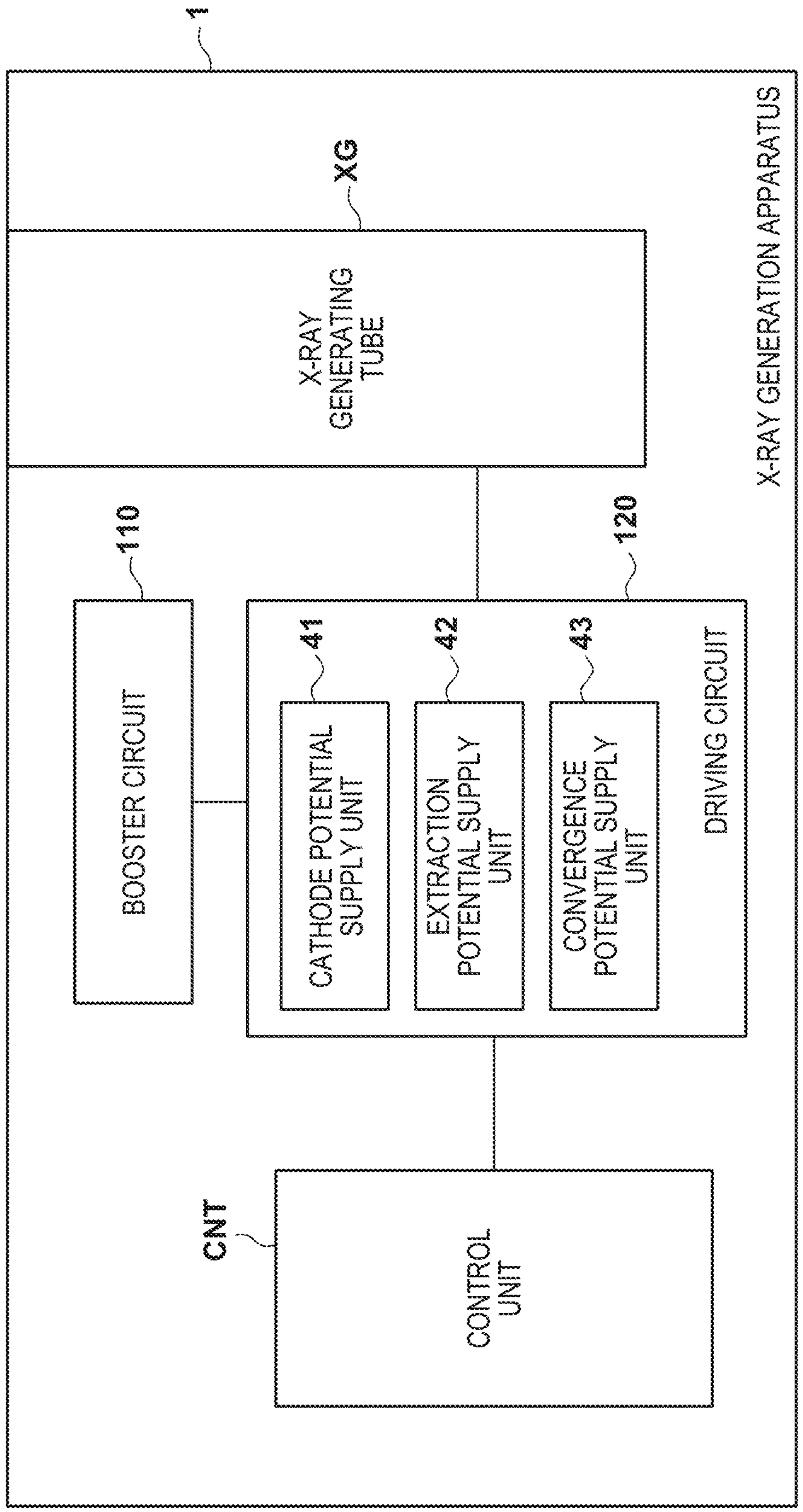
FIG. 18 is a block diagram showing the arrangement of the X-ray generating apparatus according to an embodiment.

FIG. 18 shows the arrangement of the X-ray generating apparatus 1 according to an embodiment. The X-ray generating apparatus 1 can include a booster circuit 110 and a driving circuit 120 in addition to the X-ray generating tube XG described above. The booster circuit 110 can generate a boosted voltage obtained by boosting an externally supplied voltage and supply the boosted voltage to the driving circuit 120. The driving circuit 120 can drive the X-ray generating tube XG based on the boosted voltage supplied from the booster circuit 110. The driving circuit 120 can include the cathode potential supply unit 41, the extraction potential supply unit 42, and the convergence potential supply unit 43, which have been described above.

Figure 19:
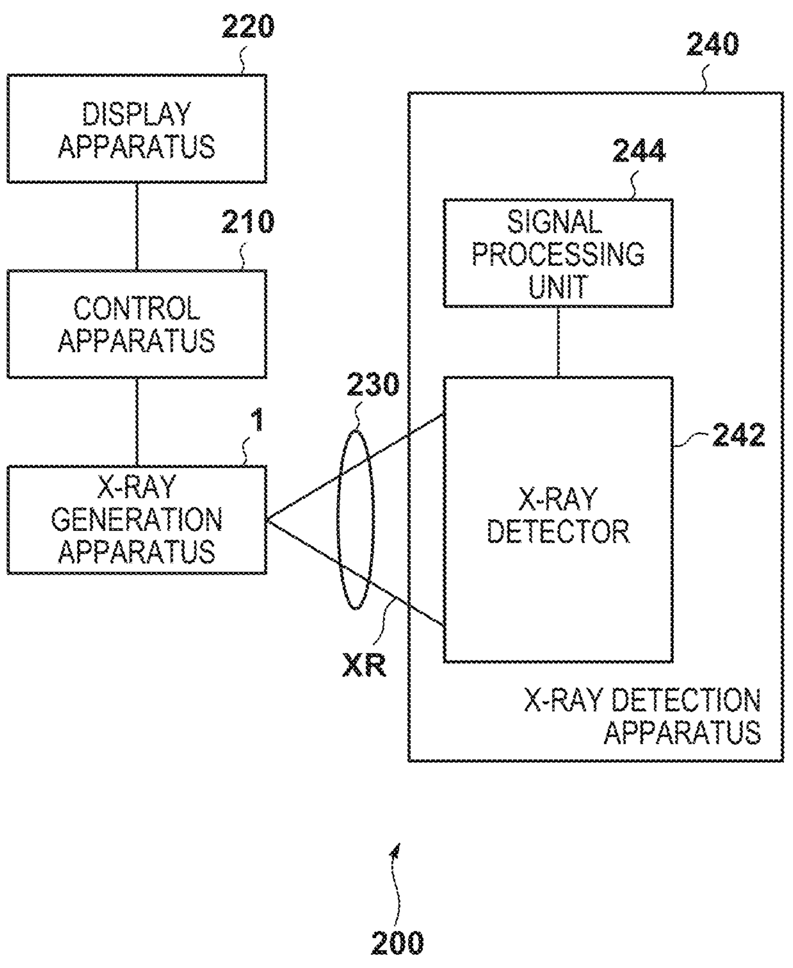
FIG. 19 is a block diagram showing the arrangement of an X-ray imaging apparatus according to an embodiment.

FIG. 19 shows the arrangement of an X-ray imaging apparatus 200 according to an embodiment. The X-ray imaging apparatus 200 can include the X-ray generating apparatus 1 and an X-ray detection apparatus 240 that detects X-rays XR emitted from the X-ray generating apparatus 1 and transmitted through an object 230. The X-ray detection apparatus 240 may further include a control apparatus 210 and a display apparatus 220. The X-ray detection apparatus 240 can include an X-ray detector 242 and a signal processing unit 244. The control apparatus 210 can control the X-ray generating apparatus 1 and the X-ray detection apparatus 240. The X-ray detector 242 can detect or image the X-rays XR emitted from the X-ray generating apparatus 1 and transmitted through the object 230. The signal processing unit 244 can process a signal output from the X-ray detector 242 and supply the processed signal to the control apparatus 210. The control apparatus 210 causes the display apparatus 220 to display an image based on the signal supplied from the signal processing unit 244. The control apparatus 210 can control the adjuster 60 in accordance with an accelerating voltage or the amount of change in accelerating voltage so as to reduce the change in the incident position of the electron beam EB onto the target 22 due to a change in accelerating voltage.

REFERENCE SIGNS LIST

1: X-ray generating apparatus, XG: X-ray generating tube, EG: electron gun, CT: cathode electrode, EE: extraction electrode, CE: convergence electrode, EB: electron beam, 20: anode, 21: target holding plate, 22: target, 23: electrode, 50: deflector, 60: adjuster, AX: central axis

The invention claimed is:

1. An X-ray generating apparatus comprising:

an X-ray generating tube including an electron gun and a target configured to generate X-rays upon receiving an electron beam emitted from the electron gun;

a deflector configured to deflect the electron beam;

a driving circuit configured to apply an accelerating voltage between a cathode of the electron gun and the target; and an adjuster configured to adjust deflection of the electron beam by the deflector in accordance with the accelerating voltage or an amount of change in the accelerating voltage so as to reduce a change in incident position of the electron beam onto the target due to a change in the accelerating voltage, wherein the deflector includes a permanent magnet, the adjuster includes an adjusting mechanism configured to perform adjustment of a position of the permanent magnet in accordance with the accelerating voltage or the amount of change in the accelerating voltage, and the adjustment of the position of the permanent magnet by the adjusting mechanism includes the adjustment of the position of the permanent magnet in a direction parallel to a central axis of the electron gun.

2. The X-ray generating apparatus according to claim 1, wherein the permanent magnet includes a first magnet and a second magnet which are arranged so as to face each other through the X-ray generating tube, and wherein an amount of deflection of the electron beam by the deflector is changed by the adjustment of the position of the permanent magnet by the adjusting mechanism.

3. The X-ray generating apparatus according to claim 2, wherein the first magnet and the second magnet are arranged such that a first magnetic pole of the first magnet and a second magnetic pole of the second magnet are arranged so as to face each other through the X-ray generating tube, wherein the first magnetic pole and the second magnetic pole are opposite to each other, and wherein an amount of deflection of the electron beam by the deflector is changed by the adjustment of the position of the permanent magnet by the adjusting mechanism.

4. The X-ray generating apparatus according to claim 1, wherein the adjusting mechanism includes an actuator configured to drive the deflector.

5. The X-ray generating apparatus according to claim 1, wherein the adjusting mechanism includes a guide configured to guide the deflector.

6. The X-ray generating apparatus according to claim 4, wherein the adjusting mechanism includes a fixing mechanism configured to fix the deflector.

7. The X-ray generating apparatus according to claim 1, wherein the adjusting mechanism includes a mechanism configured to adjust a rotational angle of the permanent magnet in accordance with the accelerating voltage or the amount of change in the accelerating voltage so as to reduce the change in the incident position of the electron beam onto the target due to a change in the accelerating voltage.

8. The X-ray generating apparatus according to claim 7, wherein the adjustment of the rotational angle of the permanent magnet by the adjusting mechanism includes the adjustment of the rotational angle of the permanent magnet around an axis perpendicular to a central axis of the electron gun.

9. The X-ray generating apparatus according to claim 1, wherein the deflector further includes an electromagnet.

10. The X-ray generating apparatus according to claim 1, wherein the incident position is within a region of a diameter equal to or less than the triple of a diameter of the electron beam at the target.

11. An X-ray imaging apparatus comprising:

an X-ray generating apparatus defined in claim 1; and an X-ray detector configured to detect X-rays emitted from the X-ray generating apparatus.

12. A method of adjusting an X-ray generating apparatus including an X-ray generating tube including an electron gun and a target configured to generate X-rays upon receiving an electron beam emitted from the electron gun, a deflector configured to deflect the electron beam, and a driving circuit configured to apply an accelerating voltage between a cathode of the electron gun and the target, the method comprising a step of adjusting deflection of the electron beam by the deflector in accordance with the accelerating voltage or an amount of change in the accelerating voltage so as to reduce a change in incident position of the electron beam onto the target due to a change in the accelerating voltage, wherein the deflector includes a permanent magnet, the step includes performing adjustment of a position of the permanent magnet in accordance with the accelerating voltage or the amount of change in the accelerating voltage, and the adjustment includes adjustment of the position of the permanent magnet in a direction parallel to a central axis of the electron gun.

* * * * *